United States Patent
Kubota et al.

(10) Patent No.: US 6,855,058 B2
(45) Date of Patent: Feb. 15, 2005

(54) GAME PROGRESS MANAGEMENT DEVICE, GAME SERVER DEVICE, TERMINAL DEVICE, GAME PROGRESS MANAGEMENT METHOD AND GAME PROGRESS MANAGEMENT PROGRAM

(75) Inventors: Kazutaka Kubota, Akashi (JP); Hiroyuki Wada, Kobe (JP); Yuuki Harano, Kobe (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 10/624,844

(22) Filed: Jul. 21, 2003

(65) Prior Publication Data

US 2004/0018876 A1 Jan. 29, 2004

(30) Foreign Application Priority Data

Jul. 24, 2002 (JP) ........................................ 2002-215595

(51) Int. Cl.$^7$ ................................................ A63F 9/24
(52) U.S. Cl. ........................................... 463/42; 463/40
(58) Field of Search ............................. 463/24, 30, 40, 463/42, 43

(56) References Cited

U.S. PATENT DOCUMENTS 5,971,271 A * 10/1999 Wynn et al. ................. 235/380
6,306,039 B1 * 10/2001 Kaji et al. .................... 463/42

FOREIGN PATENT DOCUMENTS

| WO | 98/14898 | 4/1998 |
| WO | 99/32990 | 7/1999 |

OTHER PUBLICATIONS

Hecker C et al: "Dead Reckoning A.K.A. Motion Prediction", Game Developer, Miller Freeman, San Francisco, CA, US, vol. 8, Nr. 2, Page(s) 10 XP001082934 ISSN: 1073–922X * the whole document *.

* cited by examiner

*Primary Examiner*—Kim Nguyen
(74) *Attorney, Agent, or Firm*—Jordan and Hamburg LLP

(57) ABSTRACT

A network game is continued in simulated fashion when a fault occurs in a communication circuit. A CPU 261 of a control section of an arcade's server device is provided with: an abnormality monitoring section 261b that detects a disconnected circuit that is incapable of communication in the communication circuits whose communication is necessary for progress of the game, a simulated signal generating section 261d that generates simulated operation signals that simulate the necessary operation signals required for progress of the game for each client terminal device that is connected through the disconnected circuit, and a simulated signal provision section 261e that provides the simulated signals that are thus generated to the other client terminal devices, respectively.

14 Claims, 23 Drawing Sheets

FIG.9

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 | 1 | a1 | A | MASTER | PLAYER |
| | 2 | a3 | A | MASTER | PLAYER |
| | 3 | b8 | B | SLAVE | PLAYER |
| | 4 | c2 | C | SLAVE | PLAYER |
| | ... | ... | ... | ... | ... |
| 2 ... | | | | | |

FIG.10A

ARCADE'S SERVER A

| ORIGINATING CLIENT CN (VIA ARCADE'S SERVER SN) | TRANSMITTING CLIENT CN (VIA ARCADE'S SERVER SN) |
|---|---|
| a1 | a3,b8(B),c2(C) |
| a3 | a1,b8(B),c2(C) |
| b8(B) | a1,a3,c2(C) |
| c2(C) | a1,a3,b8(B) |

FIG.10B

ARCADE'S SERVER B

| ORIGINATING CLIENT CN (VIA ARCADE'S SERVER SN) | TRANSMITTING CLIENT CN (VIA ARCADE'S SERVER SN) |
|---|---|
| a1(A) | b8 |
| a3(A) | b8 |
| b8 | A |
| c2(C,A) | b8 |

FIG.10C

ARCADE'S SERVER C

| ORIGINATING CLIENT CN (VIA ARCADE'S SERVER SN) | TRANSMITTING CLIENT CN (VIA ARCADE'S SERVER SN) |
|---|---|
| a1(A) | c2 |
| a3(A) | c2 |
| b8(B,A) | c2 |
| c2 | A |

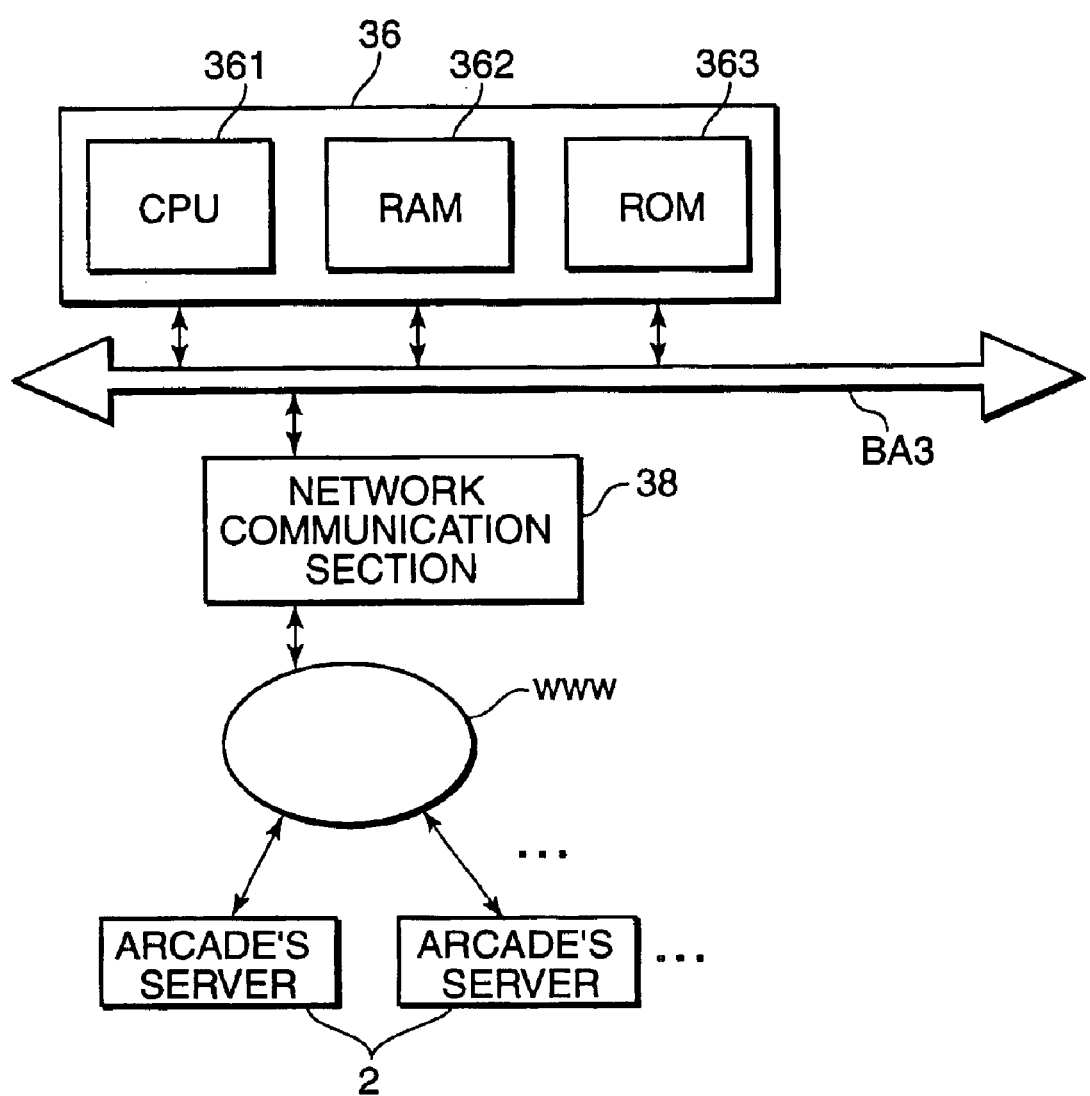

FIG.19A

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 | 1 | a1 | A | MASTER | PLAYER |
|   | 2 | a3 | A | MASTER | PLAYER |
|   |   |   |   |   | SIMULATED PLAYER |
|   |   |   |   |   | SIMULATED PLAYER |
| 2 ⋮ | ⋮ | ⋮ | ⋮ | ⋮ | ⋮ |

FIG.19B

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 |   |   |   |   | SIMULATED PLAYER |
|   |   |   |   |   | SIMULATED PLAYER |
|   | 1 | b8 | B | MASTER | PLAYER |
|   |   |   |   |   | SIMULATED PLAYER |
| 2 ⋮ |   |   |   |   |   |

FIG.19C

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 |   |   |   |   | SIMULATED PLAYER |
|   |   |   |   |   | SIMULATED PLAYER |
|   |   |   |   |   | SIMULATED PLAYER |
|   | 1 | c2 | C | SLAVE | PLAYER |
| 2 ⋮ | ⋮ | ⋮ | ⋮ | ⋮ | ⋮ |

FIG.20A

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 | 1 | a1 | A | MASTER | PLAYER |
|  | 2 | a3 | A | MASTER | PLAYER |
|  |  | a1 | A | MASTER | CPU PLAYER |
|  |  | a1 | A | MASTER | CPU PLAYER |
| 2 ⋮ | ⋮ | ⋮ | ⋮ | ⋮ | ⋮ |

FIG.20B

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 |  | b8 | B | MASTER | CPU PLAYER |
|  |  | b8 | B | MASTER | CPU PLAYER |
|  | 1 | b8 | B | MASTER | PLAYER |
|  |  | b8 | B | MASTER | CPU PLAYER |
| 2 ⋮ |  |  |  |  |  |

FIG.20C

| TABLE NUMBER TN | ORDER OF ACCEPTANCE RN | CLIENT CN | ARCADE'S SERVER SN | MASTER/SLAVE CLASSIFICATION MS | PLAYER CLASSIFICATION PC |
|---|---|---|---|---|---|
| 1 |  | c2 | C | MASTER | CPU PLAYER |
|  |  | c2 | C | MASTER | CPU PLAYER |
|  |  | c2 | C | MASTER | CPU PLAYER |
|  | 1 | c2 | C | MASTER | PLAYER |
| 2 ⋮ | ⋮ | ⋮ | ⋮ | ⋮ | ⋮ |

…

GAME PROGRESS MANAGEMENT DEVICE, GAME SERVER DEVICE, TERMINAL DEVICE, GAME PROGRESS MANAGEMENT METHOD AND GAME PROGRESS MANAGEMENT PROGRAM

BACKGROUND OF THE INVENTION

1. Field of the Invention

The present invention relates to a game progress management device whereby a prescribed number of terminal devices whereby operations are received from players are connected so as to be capable of mutual communication of the necessary operation signals for the progress of a game through a communication circuit, management of the progress of a network game played in a common game space is conducted and whereby the network game is continued in simulated fashion if a fault occurs in the aforesaid communications circuit, a game server device, a terminal device, a game management method and a game management program.

2. Description of the Related Art

Various video-game devices whereby games can be played by a plurality of players have previously been proposed or are already being employed. Also, for arcade games, video-game devices are known wherein a plurality of video-game devices (terminal devices) of the same type are provided, the plurality of video-game devices being connected through a network (and server) such as a LAN or the internet, and whereby a plurality of players can play a game in a common game space. In such video-game devices, table games such as mahjong or chess, and competing games such as sport games or fighting games can be conducted.

When such table games or competing games are being conducted, since a plurality of video-game devices are connected through a network (and server) such as a LAN or the Internet, an indefinitely large number of players can participate in the game. In this way, compared with an ordinary game in which a contest is conducted with the video-game device itself as the opponent using the video-game device in stand-alone mode, the game can be given a certain interest in that an unexpected element is introduced into the progress of the game since, if a contest is conducted with an unknown partner, the capability etc of the contestants is unknown.

Previously, when a plurality of video-game devices were connected through a communication circuit such as the public switched network, continuance of the game was difficult and the game was sometimes forcibly terminated due to failure of exchange of information between the video-game devices when some fault occurred in the communication circuits, such as a failure of a switch constituting a communication circuit. Such forcible termination of the game impairs players' confidence in the reliability of the game system, is annoying to the players and constitutes a factor causing loss of interest in the game. The above problem is even more important in particular in the case where a wireless circuit is employed as the communication circuit, since such a circuit is frequently subject to electromagnetic interference.

Also, for example in the case of a game modeled on mahjong, since the opportunities for a player to obtain a full hand are rare, if a communication fault occurs when a player is just about to obtain a full hand, causing the game to be forcibly terminated, the player will feel stress such as resentment or anger, which is a factor causing an obstacle to continuous playing of the game.

SUMMARY OF THE INVENTION

In view of the above, an object of the present invention is to provide a game progress management device, a game server device, a terminal device, a game management method and a game management program whereby a network game can be continued in simulated fashion if a fault occurs in the communication circuit.

A game progress management device according to the present invention is a game progress management device to which a prescribed number of terminal devices that receive operations from players are connected through communication circuits so as to be capable of mutual communication of operation signals necessary for proceeding with a game and whereby the progress of a network game that is conducted in a common game space is managed and the network game is continued in simulated fashion if a fault is generated in the communication circuits, comprising: abnormality monitoring means that detects a disconnected circuit in which failure of communication has occurred from the communication circuits of the prescribed number of terminal devices during progress of the game in the common game space; simulated signal generating means that generates a simulated operation signal that simulates the operation signal of each terminal device connected through the disconnected circuit; and simulated signal providing means that provides the simulated operation signal that is thus generated to the other terminal devices, respectively.

With the invention as described above, the abnormality monitoring means detects a disconnected circuit in which failure of communication has occurred from the communication circuits between the prescribed number of terminal devices during progress of the game in a common game space and the simulated signal generating means generates a simulated operation signal that simulates the operation signals of each of the terminal devices connected through the disconnected circuit and the simulated signal providing means provides (for example, transmits) the simulated signal that is thus generated to the other terminal devices, respectively.

Thus, if a fault or the like occurs in a communication circuit, causing a disconnected circuit to be generated from the communication circuits between the prescribed number of terminal devices that are conducting the game in a common game space, a simulated operation signal is provided that simulates the operation signals of each of the terminal devices that are connected through this disconnected circuit, so the other terminal devices can continue the network game in simulated fashion using this simulated operation signal. As a result, loss of interest and confidence in the network game caused by communication failures can be prevented and a network game can thereby be realized that can be continuously enjoyed by the players.

BRIEF DESCRIPTION OF THE DRAWINGS

FIG. 9 is a chart showing table information;

FIGS. 10A to 10C are charts given an explanation of the content of transmission/reception signal processing of operation signals generated by a progress condition updating section of an arcade's server device;

FIG. 11 is a hardware layout diagram showing an embodiment of a center server device;

FIGS. 19A to 19C are charts showing table information when a circuit fault location has appeared;

FIGS. 20A to 20C are charts showing table information after alteration processing of the table information in step ST19 of the flow chart shown in FIG. 15;

DESCRIPTION OF THE PREFERRED EMBODIMENTS

Figure 1:
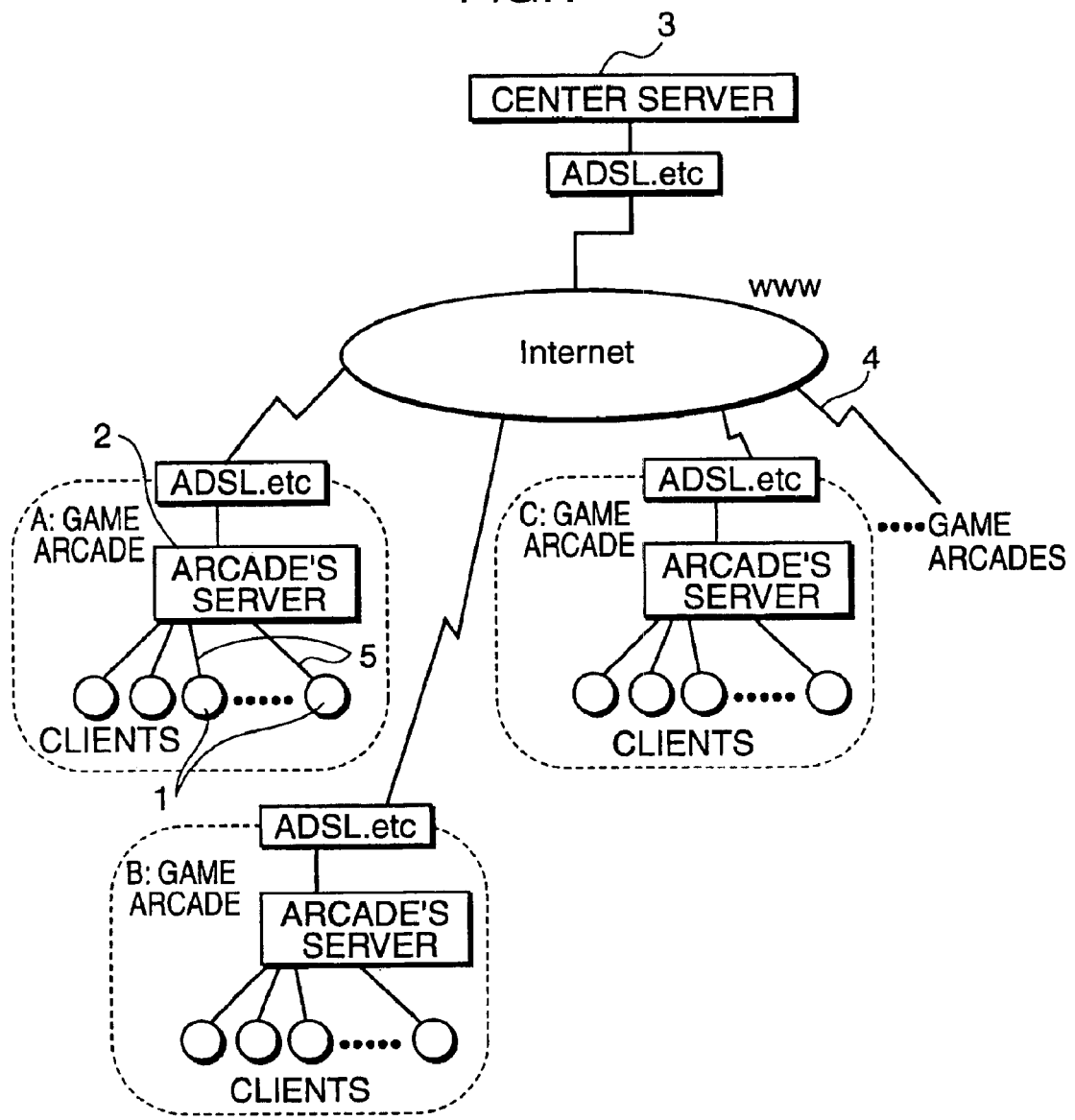
FIG. 1 is a layout diagram of a game system employing a game server device according to the present invention.

FIG. 1 is a layout diagram of a game system employing a game server device according to the present invention. The game system comprises client terminal devices (corresponding to terminal devices) 1 associated with respective identification information, arcade's server devices 2 (corresponding to game server devices) connected so as to be capable of communication through a private circuit 5 with a plurality (in this case, eight) of client terminal devices 1 associated with respective identification information and a center server device 3 that manages a game that is played by a plurality of players using the client terminal devices 1 and that is connected so as to be capable of communication through a communication circuit 4 with the plurality of arcade's server devices 2. Connection is also effected so that communication is possible through a communication circuit 4 between the arcade's server devices 2.

A client terminal device 1 receives prescribed operations that are performed by a player referring to the game screen that is displayed on a monitor and proceeds with the game using the designation information that is transmitted from the arcade's server devices 2 (or center server device 3) and operation signals or other signals from the other client terminal devices 1.

The identification information associated with a client terminal device 1 includes identification information for each arcade's server device 2 to which the client terminal device 1 is connected (or identification information of the game arcade where the client terminal device 1 is arranged) and identification information (referred to as the terminal number) of each client terminal device 1 in the game arcade where the client terminal device 1 is arranged. For example, if the identification information of the arcade's server device A of a game arcade A is A, and the identification information of the client terminal device 1 in the game arcade A is 4, the identification information of this client terminal device 1 is a4.

An arcade's server device 2 is connected so as to be capable of communication with the respective plurality of client terminal devices (in this case, eight devices) 1 and with the center server device 3, exchanges data between the client terminal devices 1 and the center server device 3 and, on detection that a communication circuit 4 has become incapable of communication, generates a simulated operation signal required for the progress of the game and transmits this to the client terminal device 1.

The center server device 3 is connected so as to be capable of communication with the plurality of arcade's server devices 2, stores, as player information, in correspondence with the user ID, the characteristic point data of a player's fingerprint required for fingerprint authentication, as will be described, and selects a player (also referred to as a contestant) for playing a game in a common game space with other players by exchanging data with client terminal devices 1 through the arcade's server device 2.

Figure 2:
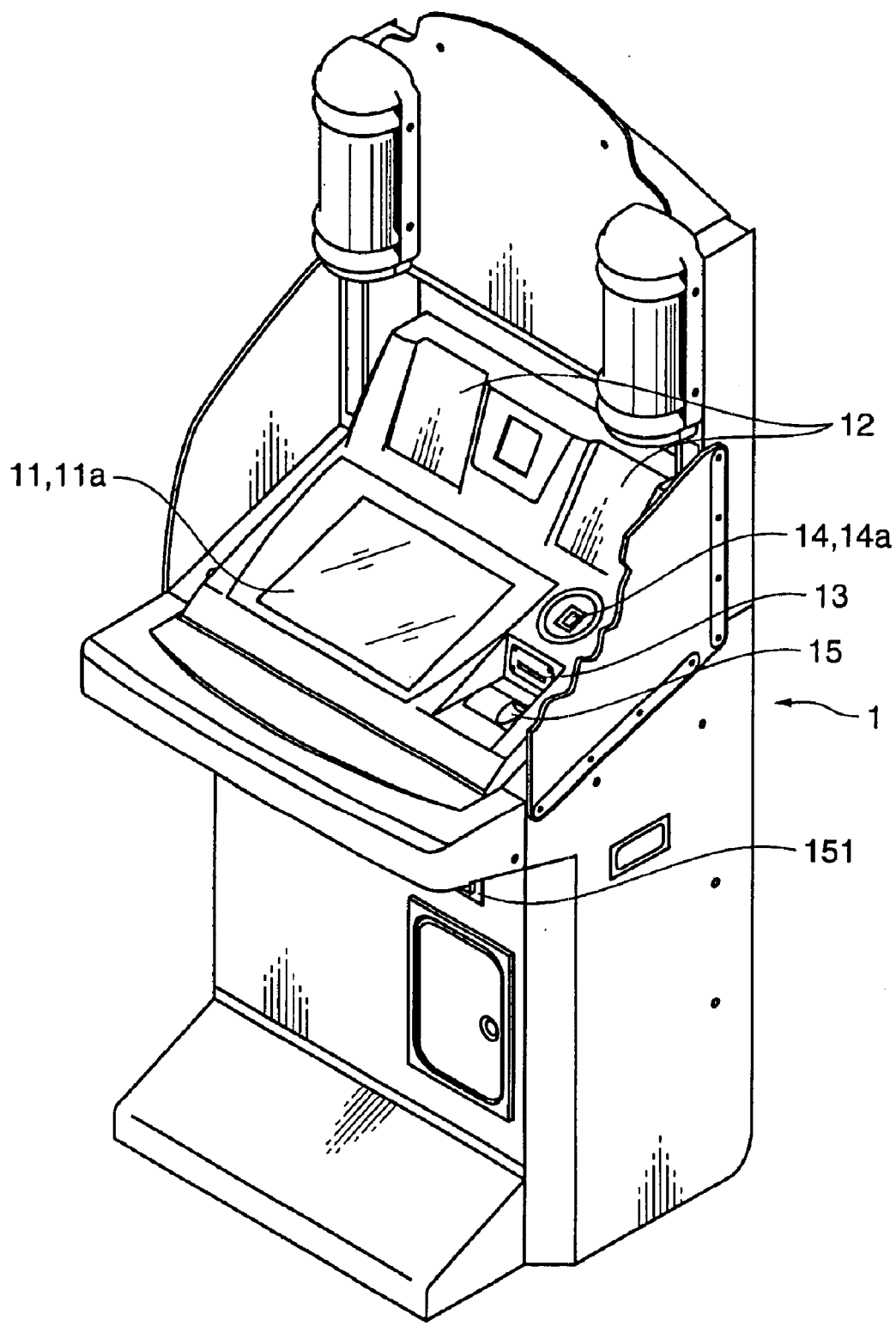
FIG. 2 is a perspective view showing the external appearance of an embodiment of a client terminal device.

FIG. 2 is a perspective view showing the external appearance of an embodiment of a client terminal device 1. Although, in the following description, as an example of a client terminal device, a commercial video-game device is described in which the monitor is integrally constructed, the present invention is not particularly restricted to this example and could also be applied in the same way to home video-game devices constituted by connecting a home video-game machine to a home television, or to personal computers or the like functioning as a video-game device by executing a video-game program.

Also, in this embodiment, the game that is played using the client terminal device 1 according to the present invention is a mahjong game and the player operating a client terminal device 1 and another client terminal device 1 or a CPU player compete with each other. When competing with the player operating another client terminal device 1, a network communication section 18, to be described, exchanges data with the client terminal device 1 through the arcade's server device 2 and center server device 3 and the like devices and stores information relating to the state of progress of the game in the arcade's server device 2.

The client terminal device 1 comprises a monitor 11 that displays a game screen, a touch panel 11a that uses a pressure device operated by the player and the address of the button to ascertain which button has been designated and which prompts selection or other operation displayed on the game screen of the monitor 11, a speaker 12 that outputs voice, a card reader 13 that reads information such as a user ID stored on an individual card, a fingerprint authentication section 14 that extracts characteristic point data required for individual authentication using fingerprint information from a CCD camera 14a, to be described, and a coin acceptance section 15 that accepts coins inserted by the player. The characteristic point data extracted by the fingerprint authentication section 14 is stored in player information 362a, to be described, in a center server device 3, by means of a network communication section 18, to be described, and arcade's server device 2 etc.

The monitor 11 is for example a thin liquid crystal display that displays an image. A speaker 12 outputs prescribed messages or BGM. The fingerprint authentication section 14 comprises a CCD camera 14a that picks up the image of the fingerprint of a player. Instead of a CCD camera 14a, other digital image pickup devices (for example a CMOS camera) may be employed. The coin acceptance section 15 comprises a coin discharge port 151 that discharges an inserted coin for example if this coin is invalid.

Also, the individual card is for example a magnetic card or IC card that stores individual information such as the user ID; the individual information can be read from the inserted individual card by means of a card reader 13, not shown.

A control section 16 (see FIG. 3) constituted by a microcomputer or the like that outputs the detected signals from various section and control signals to each section is arranged at a suitable location in the client terminal device 1.

Figure 3:
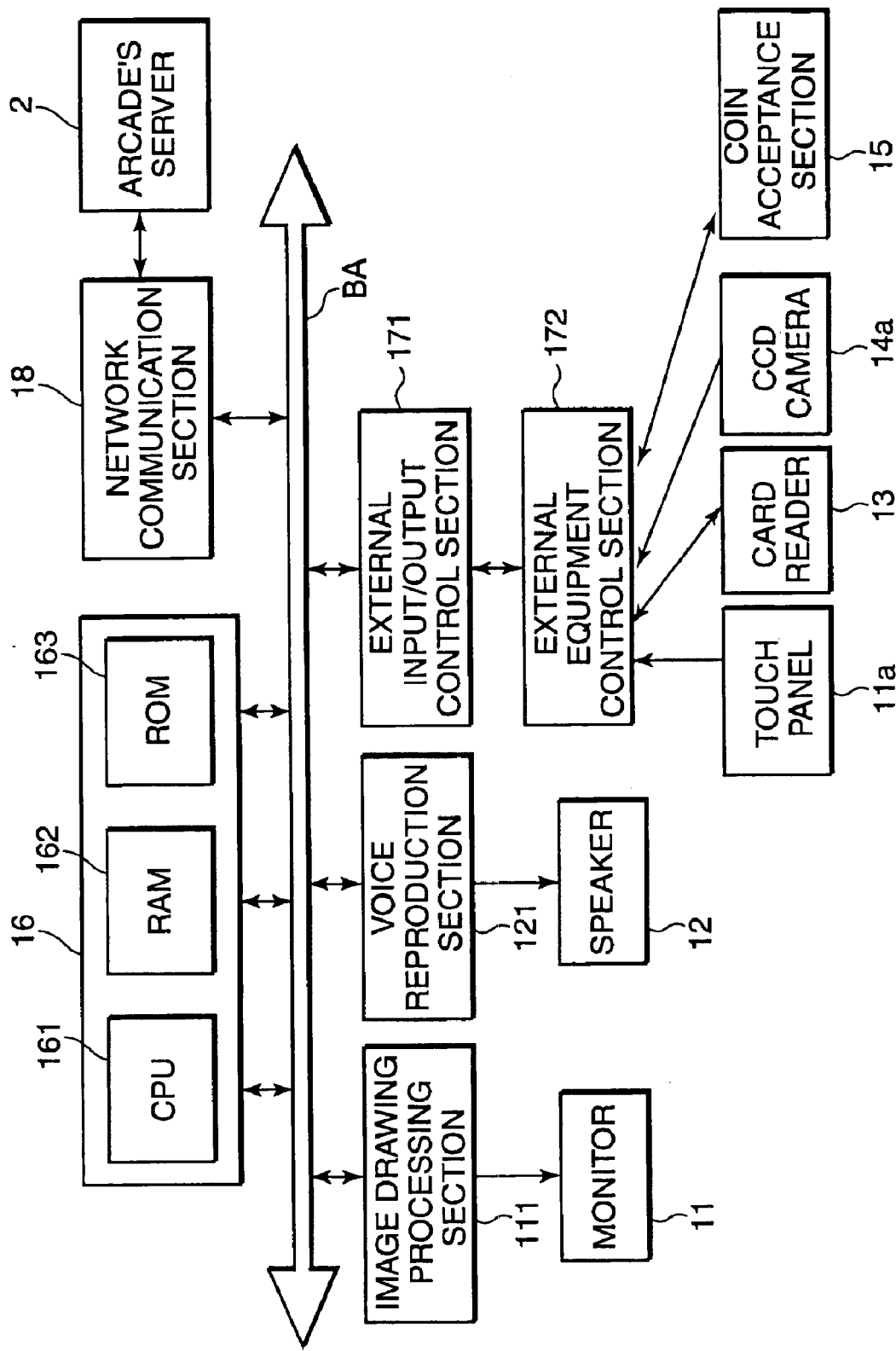
FIG. 3 is a hardware layout diagram showing an embodiment of a client terminal device.

FIG. 3 is a hardware layout diagram showing an embodiment of a client terminal device 1. The control section 16 controls the operation of the client terminal device 1 as a whole and comprises an information processing section (CPU) 161, RAM 162 that temporarily stores for example information during processing and ROM 163 on which is stored beforehand prescribed image information and a game program etc, to be described later.

The external input/output control section 171 converts the detected signals obtained from detection sections including those of a control section 16, card reader 13, touch panel 11a, CCD camera 14a and coin acceptance section 15 into digital signals for processing and outputs command information to various items of equipment of the detection sections after converting the same into control signals, and performs this signal processing and input/output processing for example in time-divided fashion. An external equipment control section 172 performs an output operation of control signals to each item of equipment of the detection sections and an input operation of the detection signals from each item of equipment of the detection sections in the respective time division periods.

An image drawing processing section 111 displays required images on the monitor 11 in accordance with image display instructions from the control section 16 and comprises a video RAM and the like. A voice reproduction section 121 outputs prescribed messages and/or BGM etc to the speaker 12 in accordance with instructions from the control section 16.

The touch panel 11a is a thin-layered body of rectangular shape constituted by arranging linear pressure sensitive elements made from a transparent material in the vertical and horizontal directions at a prescribed pitch and covering the pressure sensitive elements with a transparent cover, and is attached onto the tube surface of the monitor 11. A known type of touch panel may be employed for this touch panel 11a. The touch panel 11a is constituted such that it is possible to ascertain which button has been designated, from the position where pressure is applied and the addresses of buttons providing selective prompts that are displayed on the screen of the monitor 11.

The ROM 163 stores images such as images of mahjong tile objects, background images and various types of screen. The mahjong tile objects and other objects are constituted by a required number of polygons so that they can be drawn three-dimensionally. The image drawing processing section 111 performs processing such as calculation for conversion from position in three-dimensional space to position in simulated three-dimensional space and light source calculation, in accordance with image drawing instructions from the CPU 161, and also performs processing for writing the image data to be drawn to video RAM in accordance with the results of the above calculation, for example writing (pasting) of texture data into a video RAM area designated by polygons.

The relationship between the operation of the CPU 161 and the operation of the image drawing processing section 111 will now be described. The CPU 161 reads the image, voice and control program data and game program data from the ROM 163 under the control of the operating system (OS) recorded in the ROM 163, which may be of the incorporated or removable type. Part or all of the image, voice and control program data and other items that are thus read is held in the RAM 162. Thereafter, the CPU 161 executes processing in accordance with the control program and the various types of data (image data and voice data including polygons or texture or other details of the object displayed, and, in addition, letter images) stored in the RAM 162 and detection signals from the detection section, or other signals.

Of the various types of data stored in the ROM 163, data that can be stored on a removable recording medium may be readable by means of a drive such as for example a hard disk drive, optical disc drive, flexible disc drive, silicon disc drive or cassette media reader. In this case, the recording media may be for example a hard disk, optical disc, flexible disc, CD, DVD or semiconductor memory.

The network communication section 18 is provided for transmitting and receiving with the center server device 3 through the network and arcade's server device 2 or other devices various types of event information or other information generated during playing of the mahjong game.

An individual authentication method in the client terminal device 1 will now be described. Individual authentication means confirmation that the player who is actually playing is the same as the player identified by the client terminal device 1 (or center server device 3 connected through the network communication section 18 and the network). When a player first plays using the client terminal device 1, the user ID data is read from the inserted individual card by the card reader 13 and an image of the fingerprint of the player is picked up by the CCD camera 14a of the fingerprint authentication section 14 and the necessary characteristic point data for individual authentication is extracted using the fingerprint information from the CCD camera 14a by the fingerprint authentication section 14. The user ID data and the characteristic point data are then transmitted to the arcade's server device 2 that is connected through the network communication section 18 and the network, further transmitted from the arcade's server device 2 to the center server device 3 through a communication circuit, and stored in the player information storage section 362a, to be described later. In this way, the player is registered with the center server device 3.

When a player who is registered with the center server device 3 plays at the client terminal device 1, the user ID data is read from the inserted individual card by the card reader 13 and an image of the fingerprint of the player is picked up by the CCD camera 14a of the fingerprint authentication section 14 and the necessary characteristic point data for individual authentication is extracted by the fingerprint authentication section 14 using the fingerprint information from the CCD camera 14a. The user ID data and the characteristic point data are then transmitted to the center server device 3 that is connected through the network communication section 18, network arcade's server device 2 and so on, and the center server device 3 determines whether the characteristic point data corresponding to the user ID that is stored in a player information storage section 362a, to be described, is the same as the characteristic point data that has thus been transmitted thereto. If the result of this determination as positive, the player is allowed to play; if the result of this determination is negative, play is denied (for example an error message is displayed on the monitor 11 of the client terminal device 1 and the player is prompted to repeat the fingerprint authentication process).

Figure 4:
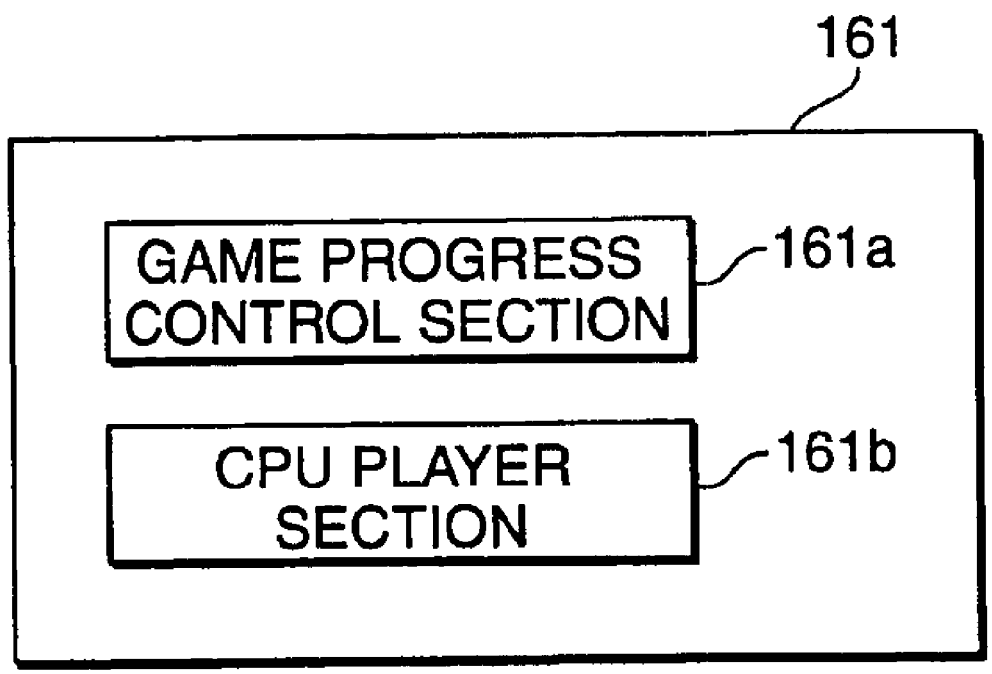
FIG. 4 is a functional layout diagram of the control section of a client terminal device.

FIG. 4 is a functional layout diagram of the control section 16 of a client terminal device 1. The CPU 161 of the control section 16 comprises a game progress control section 161a that controls progress of a game in accordance with instructions from an arcade's server device 2 while receiving operations from a player and a CPU player section 161b that generates an operation signal from a CPU player.

The game progress control section 161a receives operations supplied thereto from a player using for example a touch pad 11a and controls progress of a game in accordance with the rules of mahjong, using the instruction information from the arcade's server device 2 (or center server device 3) and the operation signal from another client terminal device 1 at which the game is being played in the same game space (in this case, on the same virtual table).

Note that the mahjong game played here consists of 4 games at east wind. The game progress control section 161a, when each game of the first to third games at the east wind has terminated, outputs a "game termination" signal to the arcade's server device 2 and, on receiving an operation input from the player as to whether or not the play is to be continued, if an operation signal to the effect that the game is not be continued is received, terminates the match or, if an operation signal to the effect that the game is to be continued is received, continues the match.

The CPU player section 161b generates an operation signal when the simulated CPU player performs a virtual operation and, in the same way as in the case of an operation performed by a player in the mahjong game, generates operation signals corresponding to operations such as an operation of selecting a tile to be discarded after "tsumo" (drawing a new tile) or "naki" (picking up a tile discarded by another player) or operations such as "naki" (pung/chow/kong), or not.

Figure 5:
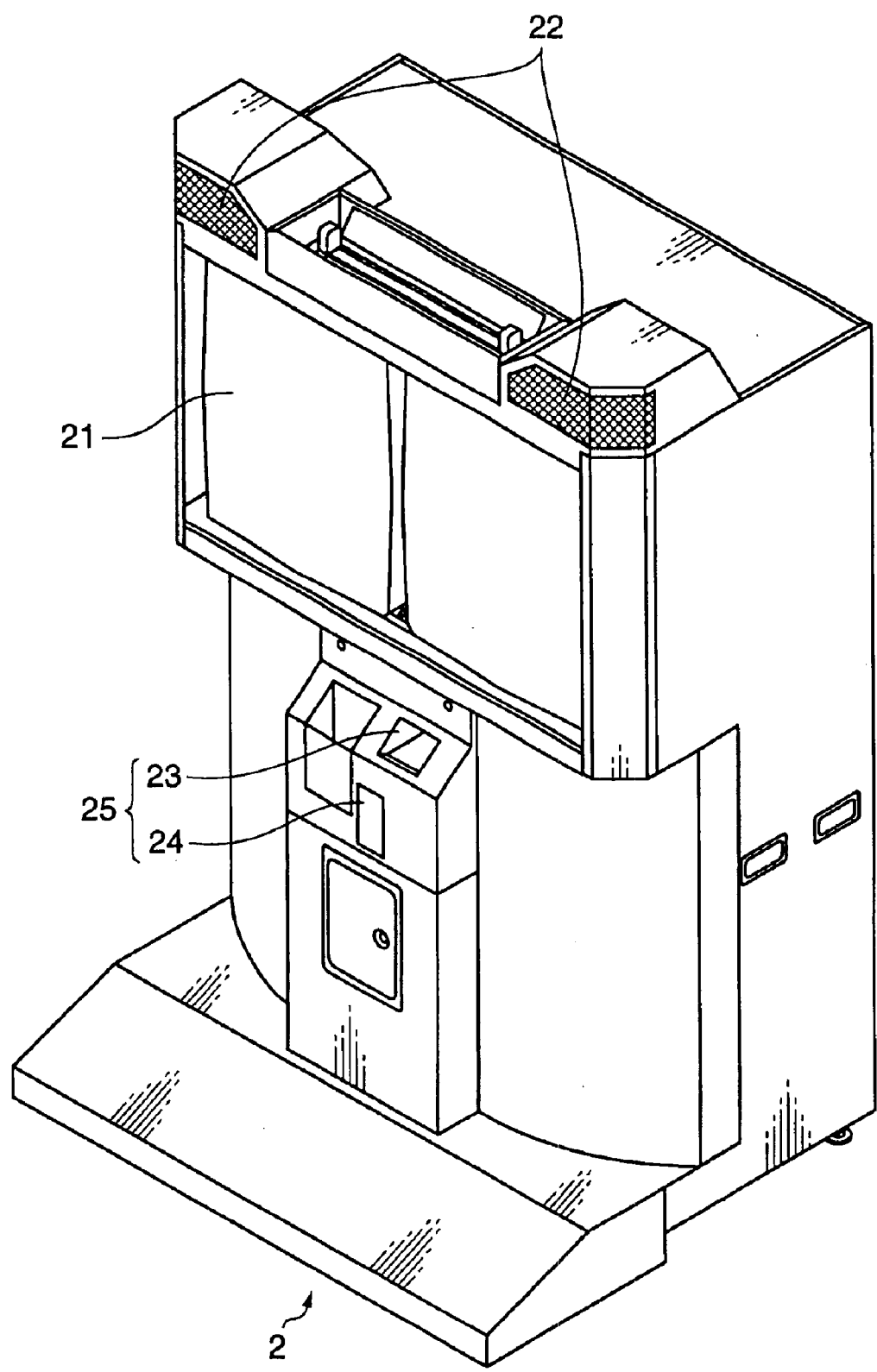
FIG. 5 is a perspective view showing the external appearance of an embodiment of an arcade's server device.

FIG. 5 is a perspective view showing the external appearance of an embodiment of an arcade's server device 2. The arcade's server device 2 comprises a monitor 21 that displays the game screen or the like, a speaker 22 that outputs voice and an individual vending machine 25 that vends an individual card on accepting a coin inserted by a player.

The monitor 21 comprises for example two CRT's, with the object of displaying a large image. The two CRT's are arranged such that the long sides of the screen display sections of substantially rectangular shape that display respective images are adjacent and control of the image signal is performed such that a single image is displayed by the two image display sections.

The speaker 22 outputs prescribed messages or BGM. The individual card vending machine 25 comprises a coin acceptance section 24 that accepts a coin inserted by a player and a card dispensing section 23 that dispenses an individual card. The coin acceptance section 24 comprises a coin discharge port (not shown) that discharges the inserted coin if for example the coin is not valid.

At a suitable location of the arcade's server device 2, there is provided a control section 26 (see FIG. 6) constituted by for example a microcomputer that inputs a detection signal from various sections and outputs a control signal to the various sections.

Figure 6:
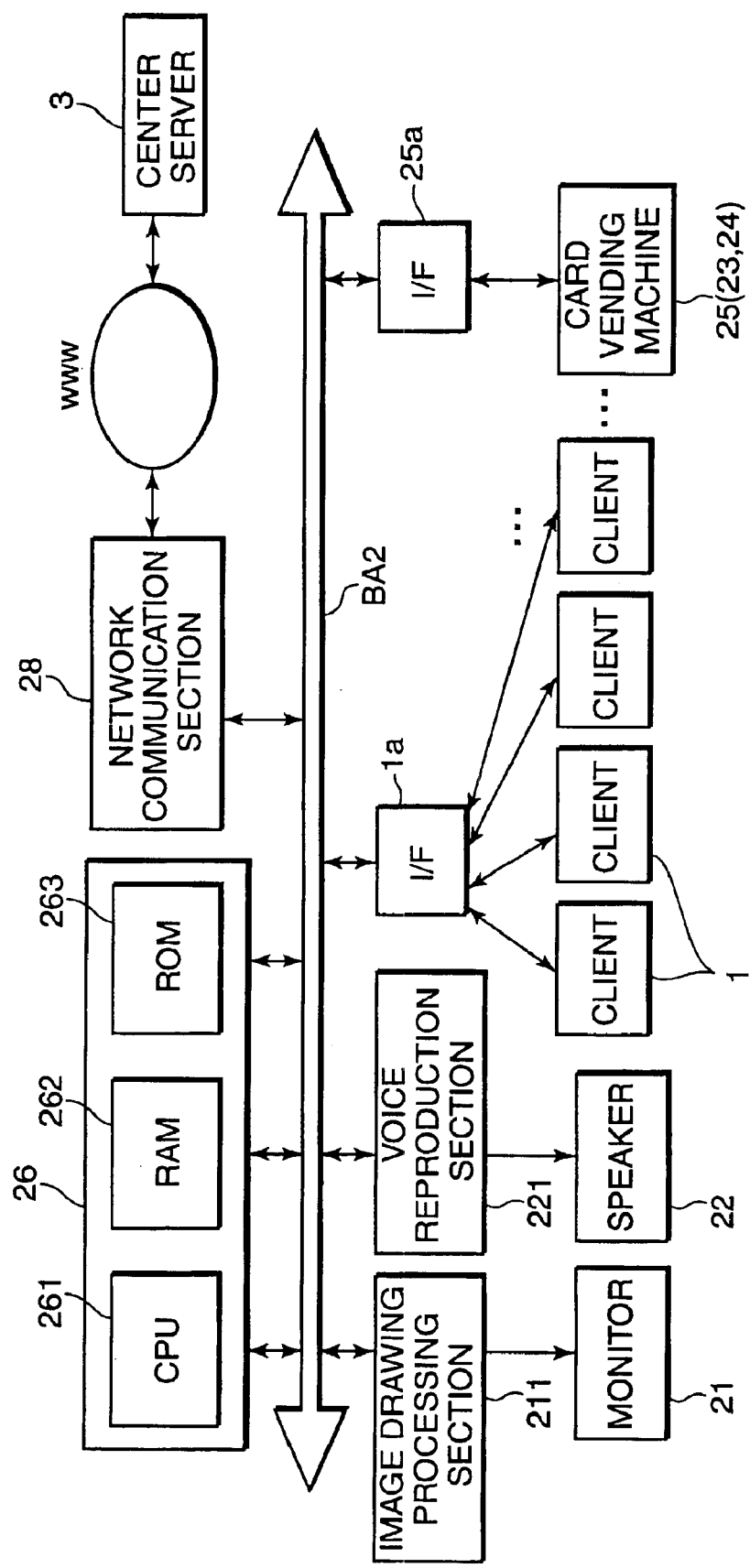
FIG. 6 is a hardware layout diagram showing an embodiment of an arcade's server device.

FIG. 6 is a hardware layout diagram showing an embodiment of an arcade's server device 2. A control section 26 controls overall operation of the arcade's server device 2 and comprises an information processing section (CPU) 261, RAM 262 that temporarily stores information for example during processing and ROM 263 in which is stored beforehand information such as of prescribed images.

An image drawing processing section 211 effects display of a required image on the monitor 21 in accordance with image display instructions from the control section 26 and comprises a video RAM and other items. A voice reproduction section 221 outputs to a speaker 22 prescribed messages or BGM or the like in accordance with instructions from the control section 26.

Of the various types of data stored in the ROM 263, data that can be stored on a removable recording medium may be readable by means of a drive such as for example a hard disk drive, optical disc drive, flexible disc drive, silicon disc drive or cassette media reader; in this case, the recording media may be for example a hard disk, optical disc, flexible disc, CD, DVD or semiconductor memory.

The network communications section 28 is provided to exchange various types of data with the center server device 3 and other arcade's server devices 2 through a network such as WWW. An interface section 1a is provided in order to perform exchange of data with a plurality (for example eight) of client terminal devices 1 that are connected with an arcade's server device 2.

A game progress management program according to the present invention is recorded in the ROM 263 and thence loaded into the RAM 262. The respective functions thereof are then implemented by the CPU 261 successively executing the game progress management program in the RAM 262.

Figure 7:
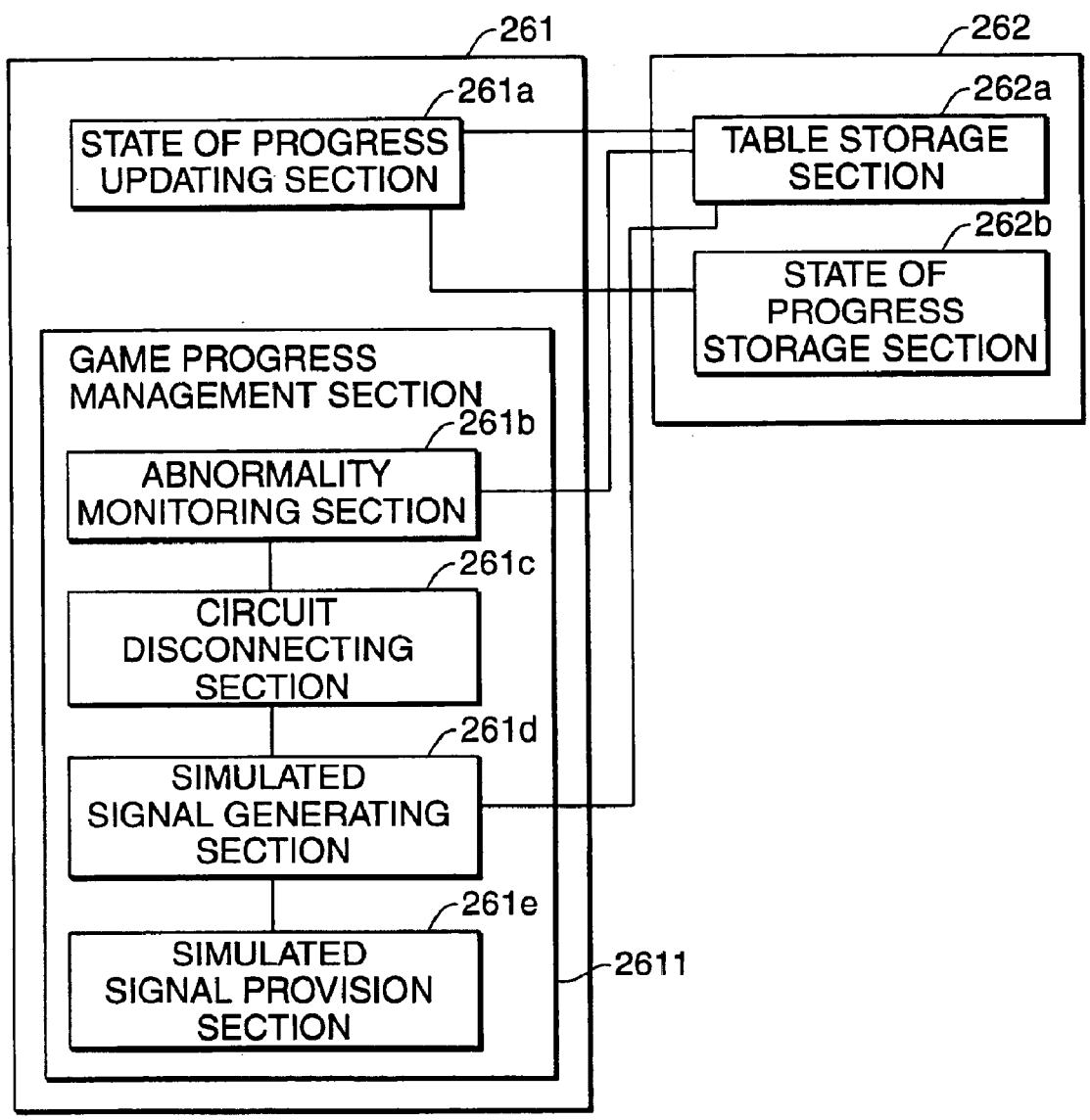
FIG. 7 is a functional layout diagram of the control section of an arcade's server device.

FIG. 7 is a functional layout diagram of a control section 26 of the arcade's server device 2. The RAM 262 of the control section 26 comprises a table storage section 262a that stores the table information i.e. information relating to the mahjong table on which the virtual game of mahjong is being conducted by the client terminal devices 1 and a state of progress storage section 262b that stores information relating to the state of progress of the game on each mahjong table on which virtual games of mahjong are being conducted by the client terminal devices 1. The CPU 261 comprises a state of progress updating section 261a that updates the state of progress of the game stored on the state of progress storage section 262b by exchanging data with the client terminal devices 1 and other arcade's server devices 2 in accordance with the table information stored in the table storage section 262a and a game progress management section 2611 (corresponding to the game progress management device) that continues a game in a simulated fashion, if a fault occurs in a communication circuit.

Figure 8:
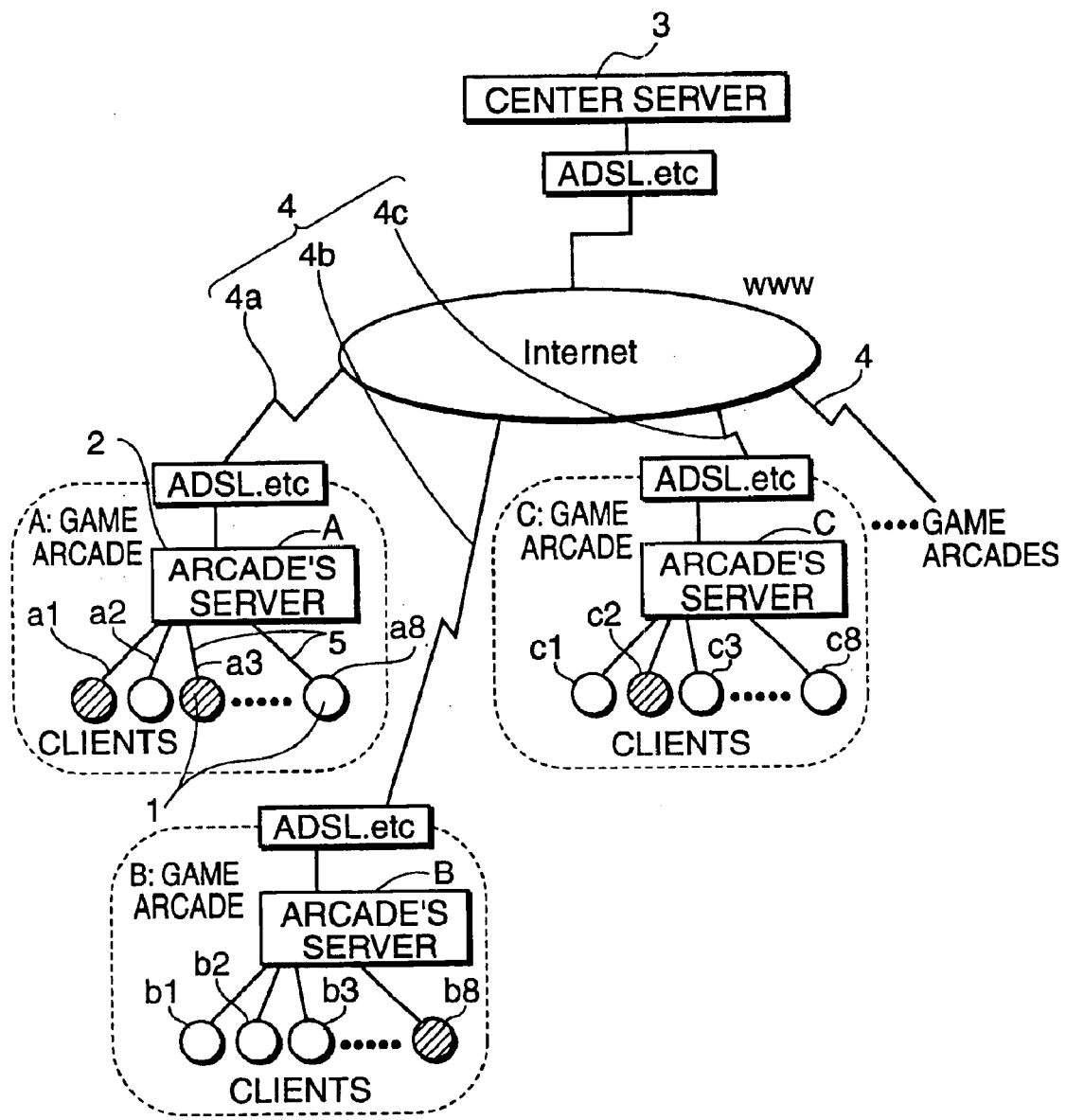
FIG. 8 is a layout diagram of an example of a game system.

As shown in FIG. 8, a specific description with reference to FIG. 9 and FIG. 10 will now be given of the content of the table information stored in the table information section 262a and the content of processing performed by the state of progress updating section 261a in the case where a game is being conducted in a common game space by means of client terminal devices a1 and a3 connected through a private circuit 5 with an arcade's server A, a client terminal device b8 connected through a private circuit 5 with an arcade's server B and a client terminal device c2 connected through a private circuit 5 with an arcade's server device C.

The case where participation in the game is accepted by the center server device 3 in the order: client terminal device a1, client terminal device a3, client terminal device b8 and client terminal device c2 will be described. The center server device 3 designates the arcade's server device 2 (in this case arcade's server device A) that is connected through the private circuit 5 with the client terminal device 1 (in this case client terminal device a1) that is the first to be accepted (in respect of which an instruction operation for set-up of a table is performed) by the center server device as the master server, which plays an intermediate role in exchange of information between arcade's server devices 2, and designates other arcade's server devices 2 (in this case arcade's server devices B and C) that are connected through a private circuit 5 with a client terminal device 1 as slave servers, which play an auxiliary role in the exchange of information between the arcade's server devices 2, and transmits the results of this designation to the arcade's server devices 2. The local server devices 2 store the results of this designation of master server and slave server that is transmitted thereto in a table storage section 262a.

FIG. 9 shows in tabular fashion the table information of a table constituted by the client terminal devices a1, a3, b8 and c2 shown in FIG. 8. In order from the column on the left-hand side, the following information is stored: the table number TN, which is an identification number of the table, which is allocated to each table in accordance with a prescribed rule when a table is created by the center server device 3; the order of acceptance RN, which is the number of the order of acceptance by the center server device 3; the client symbol CN, which is the identification information of the client terminal device 1 (in this case, for convenience in description, the reference symbol is used for the client symbol CN); the arcade's server symbol SN, which is the identification information of the arcade's server device 2 (in this case, for convenience in description, the reference symbol is used for the arcade's server symbol SN); the master/slave classification MS, that expresses the distinction whether the arcade's server device 2 functions as a master server or functions as a slave server; and the player classification PC, which expresses the classification of the player operating the client terminal device 1.

In the player classification PC, there is stored "player" if the client terminal device 1 is being operated by a human player, or, if operation is being conducted in simulated fashion by a simulation signal generating section 261d, to be described, "simulated player" is stored, or, if operation is being conducted by a CPU player, "CPU player" is stored. It should be noted that, when the player classification PC of the four players in a table is "simulated player" or "CPU player", the table information in question is deleted from the table storage section 262a.

The table information shown in FIG. 9 indicates for example: that table No. 1 comprises the client terminal devices a1, a3, b8 and c2; that client terminal devices a1, a3 are connected through the private circuit 5 with the arcade's server device A; that the arcade's server device A is functioning as a master server and the arcade's server devices B and C are functioning as slave servers; and that the client terminal devices a1, a3, b8 and c2 are being operated by human players. It should be noted that the table information that the table number is "1" shown in FIG. 9 is stored in the table storage sections 262a of the arcade's server devices A, B and C.

FIGS. 10A, 10B, and 10C are tables given in explanation of the details of processing for exchange of operation signals performed by the state of progress updating sections 261a of the arcade's server devices A, B and C. FIGS. 10A, B and C are tables given in explanation of the details of processing performed by the state of progress updating sections 261a of the arcade's server devices A, B and C, respectively. In the left-hand column of the table, there are entered the client symbol CN of the client terminal device 1 which is the transmission source of the operation signal that is received by the arcade's server device 2 (arcade's server device A, B or C) and the arcade's server symbol SN of the arcade's server device 2 through which this operation signal has passed before being received by the arcade's server device 2 in question. In the column on the right-hand side of the table there are entered the client symbol CN of the client terminal device 1 which is the transmission destination of the operation signal that is transmitted from the arcade's server device 2 (arcade's server device A, B or C) and the arcade's server symbol SN of the arcade's server device 2 through which this operation signal has passed before being received by the client terminal device 1 in question. It should be noted that the state of progress updating sections 261a of the arcade's server devices A, B and C update the information of the state of progress storage section 262b on receipt of an operation signal from the client terminal devices a1, a3, b8 and c2.

As shown by the second line from the top of the table in FIG. 10A, the state of progress updating section 261a of the arcade's server device A receives an operation signal from the client terminal device a1 and transmits this operation signal to the client terminal device a3 and arcade's server devices B and C. The state of progress updating section 261a of the arcade's server device B then receives the operation signal from the client terminal device a1 through the arcade's server device A, as shown in the second line from the top of the table in FIG. 10B and transmits this operation signal to the client terminal device b8. As shown in the second line from the top of the table in FIG. 10C, the state of progress updating section 261a of the arcade's server device C receives the operation signal from the client terminal device a1 through the arcade's server device A and transmits this to the client terminal device c2.

Likewise, as shown in the third line from the top of the table in FIG. 10A, on receipt of an operation signal from the client terminal device a3, the state of progress updating section 261a of the arcade's server device A transmits this signal to the client terminal device a1 and the arcade's server devices B and C. The state of progress updating section 261a of the arcade's server device B then, as shown in the third row from the top of the table in FIG. 10B, receives the operation signal from the client terminal device a3 through the arcade's server device A and transmits this signal to the client terminal device b8. The state of progress updating section at 261a of the arcade's server device C then, as shown in the third row from the top of the table in FIG. 10C, receives the operation signal from the client terminal device a3 through the arcade's server device A and transmits this operation signal to the client terminal device c2.

As shown in the fourth row from the top of the table in FIG. 10B, the state of progress updating section 261a of the arcade's server device B receives the operation signal from the client terminal device b8 and transmits this operation signal to the arcade's server device A. As shown in the fourth row from the top of the table in FIG. 10A, the state of progress updating section 261a of the arcade's server device A then receives the operation signal from the client terminal device b8 through the arcade's server device B and transmits this signal to the client terminal devices a1 and a3 and to the arcade's server device C. The state of progress updating section 261a of the arcade's server device C then, as shown in the fourth row from the top of the table in FIG. 10C, receives the operation signal from the client terminal device b8 through the arcade's server devices B and A and transmits this signal to the client terminal device c2.

Likewise, as shown in the fifth row from the top of the table in FIG. 10C, the state of progress updating section 261a of the arcade's server device C receives the operation signal from the client terminal device c2 and transmits this signal to the arcade's server device A. As shown in the fifth row from the top of the table in FIG. 10A, the state of progress updating section 261a of the arcade's server device A receives the operation signal from the client terminal device c2 through the arcade's server device C and transmits this signal to the client terminal devices a1 and a3 and the arcade's server device B. As shown in the fifth row from the top of the table in FIG. 10B, the state of progress updating section 261a of the arcade's server device B then receives the operation signal from the client terminal device c2 through the arcade's server devices C and A and transmits this signal to the client terminal device b8.

The client terminal devices a1, a3, b8 and c2 can therefore easily control time synchronization (matching with the state of progress of the game) in progress of the game between the client terminal devices a1, a3, b8 and c2, since the game is conducted using the progress information stored in the state of progress storage section 262b, since the information of the state of progress storage section 262b is updated every time the state of progress updating section 261a receives an operation signal from the client terminal devices a1, a3, b8 or c2, by transmission of the operation signals from the client terminal devices a1, a3, b8 and c2 between the arcade's server devices A, B and C.

That is, the master server receives the operating information from a client terminal device 1 that is connected thereto by a private circuit and transmits this information to all of the other client terminal devices 1 and receives the operation signals from the client terminal devices 1 that are connected by private circuits with the slave servers through the slave servers and transmits these operation signals to all of the other client terminal devices 1. Also, the slave servers receive the operating information from the client terminal devices 1 that are connected by private circuits and transmit this information to the master server and receive operation signals from all of the other client terminal devices 1 through the master server and transmit these operation signals to the client terminal devices 1 that are connected by the private circuits.

The description again returns to FIG. 7. The game progress management section 2611 comprises: an abnormality monitoring section 261b that detects a disconnected circuit, which is a communication circuit that is incapable of communication, from among the communication circuits whose communication is necessary in the progress of the game, using the table information stored in the table storage section 262a; a circuit disconnection section 261c that disconnects the connection with the arcade's server device 2 that is connected through the disconnected circuit; a simulated signal generating section 261d that generates simulated operation signals that simulate the necessary operation signals for progress of the game for each client terminal device 1 connected through the disconnected circuit; and a simulated signal provision section 261e that transmits to each of the client terminal devices 1 the simulated operation signals that are thus generated.

The abnormality monitoring section 261b selects the communication circuits whose communication is necessary in the progress of the game, using the table storage section 262a, and detects a communication circuit over which communication has failed continuously for a prescribed time (for example 15 seconds) from among the communication circuits thus selected, and deems this communication circuit to be a disconnected circuit. A specific description of the method of selecting the communication circuits that are necessary for communication in progress of the game when the table information shown in FIG. 9 is stored in the table storage section 262a is given with reference to FIG. 8.

As shown in FIG. 9, since the arcade's server device A is the master server, it is necessary that it should communicate with all of the slave servers in order to transmit the operation signals. Accordingly, the abnormality monitoring section 261b of the arcade's server device A selects the communication circuits 4a, 4b, 4c shown in FIG. 8, which are the communication circuits between the arcade's server devices A and B and the arcade's server devices A and C, as communication circuits whose communication is necessary for progress of the game.

Since the arcade's server device B (or C) is a slave server, as shown in FIG. 9, it is necessary that it should communicate with the master server in order to transmit operation signals. Accordingly, the abnormality monitoring section 261b of the arcade's server device B (or C) selects as communication circuits whose communication is necessary for progress of the game the communication circuits 4a, 4b (or communication circuits 4a, 4c) shown in FIG. 8, which are the communication circuits between the arcade's server devices A and B (or between the arcade's server devices A and C).

The description again returns to FIG. 7. The circuit disconnection section 261c disconnects the connection with the arcade's server device 2 and the communication circuit that was detected as a disconnected circuit by the abnormality monitoring section 261b. Specifically, the circuit disconnection section 261c instructs the network communication section 28 (see FIG. 6) that exchange of signals with the arcade's server device 2 (or the center server device 3) that is connected to the disconnected circuit is not to be accepted.

The simulated signal generating section 261d then rewrites the player classification PC of the table information corresponding to the client terminal device 1 that is connected through the communication circuit that has thus been detected as a disconnected circuit, of the table information stored in the table storage section 262a, from "player" to "simulated player".

Also, the simulated signal generating section 261d generates a simulated operation signal that simulates the operation signals that are necessary for progress of a game for each of the client terminal devices 1 that are connected through the disconnected circuit and generates a simulated operation signal corresponding to a virtual operation of picking up a tile and immediately discarding this tile ("tsumokiri"). That is, if it is the turn of the client terminal device 1 that is connected through the disconnected circuit during progress of the game to pick up a tile, a simulated operation signal is generated whereby a pickup tile is picked up and the pickup tile is selected as a discarded tile and discarded to the pile. The virtual player that performs this "tsumokiri" of picking up a tile and immediately discarding the tile is the "simulated player" referred to above.

Also, if the simulated signal generating section 261d receives a "game terminated" signal, to be described, from the client terminal device 1 during the course of the game (in this case, if the game terminated at the time-point where the circuit was deemed to be disconnected), the player of the client terminal device 1 that was connected through the disconnected circuit is virtually altered to "CPU player", instead of "simulated player". In other words, the CPU player section 161b of the client terminal device 1 is instructed to generate the operation signals of a "CPU player".

The simulated signal provision section 261e transmits to the client terminal device 1 that is connected through a private circuit with the arcade's server device 2 (i.e. that is the subject of management of the progress of the game by the arcade's server device 2) the simulated operation signal that is generated by the simulated signal generating section 261d.

FIG. 11 is a hardware layout diagram showing an embodiment of a server device 3. A control section 36 controls the overall operation of the center server device 3 and comprises an information processing section (CPU) 361, RAM 362 that temporarily stores for example information during processing and ROM 363 in which prescribed image information and the like is stored beforehand.

The various types of data stored in the ROM 363 may be stored on removable recording media readable by a drive such as for example a hard disk drive, optical disc drive, flexible disc drive or silicon disc drive or cassette media reader and in this case the recording media employed may be for example a hard disk, optical disc, flexible disc, CD, DVD, or semiconductor memory.

The network communication section 38 serves for exchanging various types of data with a plurality of arcade's server devices 2 through a network such as WWW.

Figure 12:
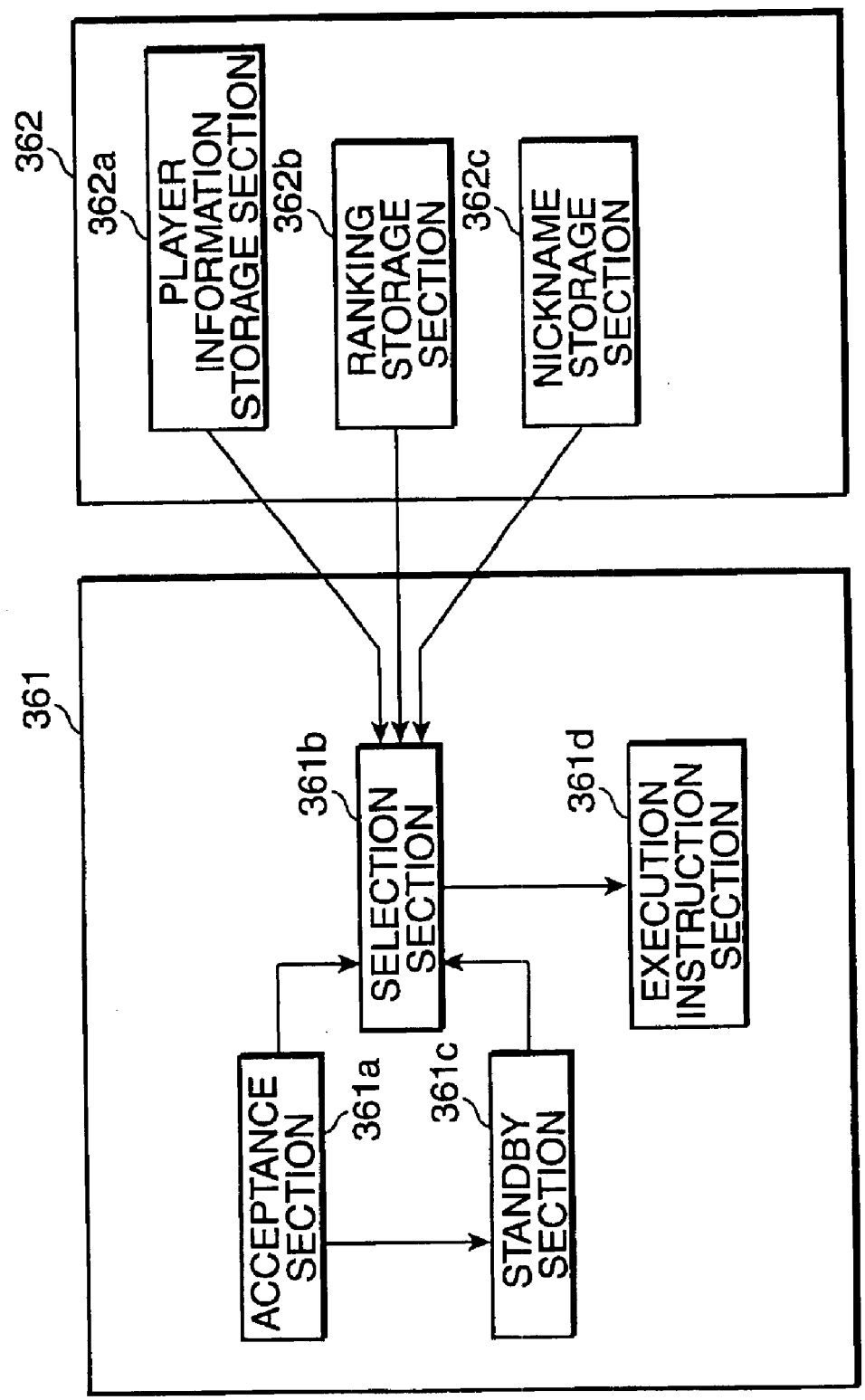
FIG. 12 is a functional layout diagram of the control section of the center server device.

FIG. 12 is a functional layout diagram of a control section 36 of a center server device 3. The CPU 361 of the control section 36 comprises an acceptance section 361a that accepts participation of a player in a game on commencement of a game by the client terminal devices 1, a selection section 361b that selects players up to a prescribed maximum number (in this case, four) and of at least a prescribed number (in this case two) to play in a common game space, from players to have been accepted by the acceptance section 361a and players who have been put in a standby condition by a standby section 361c, to be described, a standby section 361c that puts the playing question into a standby condition if the player has been selected by the selection section 361b and causes the selection section 361b to select players, and an execution instruction section 361d that causes a game to be executed in a common game space by the players selected by the selection section 361b.

The RAM 362 comprises a player information storage section 362a that stores individual information such as user ID and fingerprint characteristic point data, a ranking storage section 362b that stores level information representing the level of skill of a player in the game in association with the identification information of the player (user ID data), and a nickname storage section 363c that stores nickname information expressing characteristics of the player's strategy in the game, in association with the player's identification information.

The acceptance section 361a accepts individual information such as for example the player's user ID and fingerprint characteristic point data transmitted from each client terminal device 1 and accepts participation of players in the game in accordance with the player information stored in the player information storage section 362a.

The selection section 361b selects at least two and no more than four players to play in the same game space from the players who have been accepted by the acceptance section 361a and the players who have been put in a standby condition by the standby section 361c, in accordance with the level stored in the ranking storage section 362b and the nicknames stored in the nickname storage section 363c. Specifically, it selects players whose player level (ranking) differs by no more than a prescribed number of levels (for example 2) and that have different nicknames.

If a player has not been selected by the selection section 361b, the standby section 361c puts this player in the standby condition and causes the selection section 361b to perform player selection. The standby condition is a condition in which a player is waiting for an opponent to be selected by the selection section 361b.

The execution instruction section 361d allows the players selected by the selection section 361b to play a game in a common game space. In more detail, it transmits to the client terminal device 1 employed by the selected player instruction information whereby the game may be played with players selected by the selection section 361b as opponents (virtually sitting at the same table).

Figure 13:
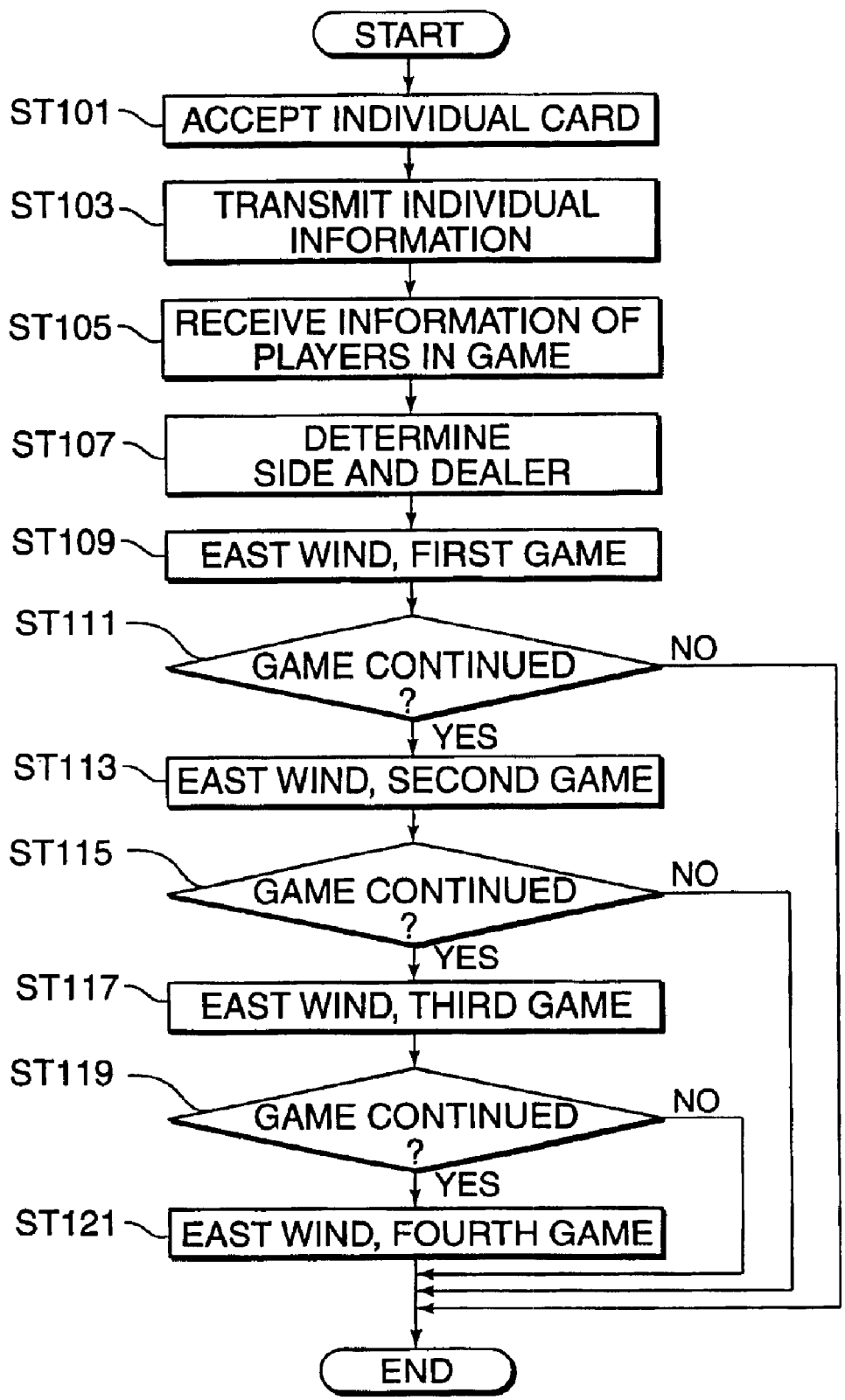
FIG. 13 is an example of a flow chart showing the operation of a client terminal device.

FIG. 13 is an example of a flow chart representing the operation of a client terminal device 1. The following processing is conducted by the game progress control section 161a, unless otherwise specially noted. First of all, the user ID data is read from the individual card inserted into the card reader 13 and an image of the player's fingerprint is picked up by the CCD camera 14a of the fingerprint authentication section 14 and the necessary characteristic point data for individual authentication are extracted by the fingerprint authentication section 14 (step ST101) using the fingerprint information from the CCD camera 14a. The user ID data and the characteristic point data are then transmitted to the center server device 3 (step ST103).

Another player (opponent) to play the game in a common game space is then selected by the center server device 3 and the opponent's information, such as name, ranking and nickname, are received (step ST105). Next, on receiving instruction information for executing the game from the center server device 3, the game is commenced and the side and dealer are determined (step ST107). The east wind, first game is then commenced (step ST109).

Next, at the time point where the east wind, first game has terminated, a "game termination" signal to the effect that the east wind, first game has terminated, is output to the arcade's server device 2 and operation input to specify whether or not the play should be continued is received (step ST111). If operation input to the effect that the play should be continued is received, processing advances to step ST113 and the play is continued. If operation input to the effect that the play should not be continued is accepted, a signal corresponding to play termination is output to the arcade's server device 2 and processing is terminated.

If the decision in step ST111 is positive, the east wind, second game is commenced (step ST113). At the time point where the east wind, second game has terminated, a game terminated signal to the effect that the east wind second game has terminated is output to the arcade's server device 2 and operation input indicating whether or not the play is to be continued is received (step ST115). If operation input to the effect that the play is to be continued is received, processing advances to step ST117 and the play is continued. If operation input to the effect that the play is not to be continued is received, a signal corresponding to play termination is output and processing is terminated.

If the decision in step ST115 is positive, the east wind, third game is commenced (step ST119). At the time point where the east wind, third game has terminated, a game completion signal to the effect that the east wind, third game has terminated is output to the arcade's server device 2, and operation input as to whether or not the play is to be continued is received (step ST119). If operation input to the effect that the play is to be continued is received, processing advances to step ST121 and the play is continued. If operation input to the effect that the play is not to be continued is received, a signal corresponding to contest termination of the play is output to the arcade's server device 2 and processing is terminated.

If the decision in step ST119 is positive, the east wind, fourth game is commenced (step ST121). Then, at the time point where the east wind, fourth game is terminated, a signal corresponding to termination of the play is output to the arcade's server device 2 and processing is terminated.

Figure 14:
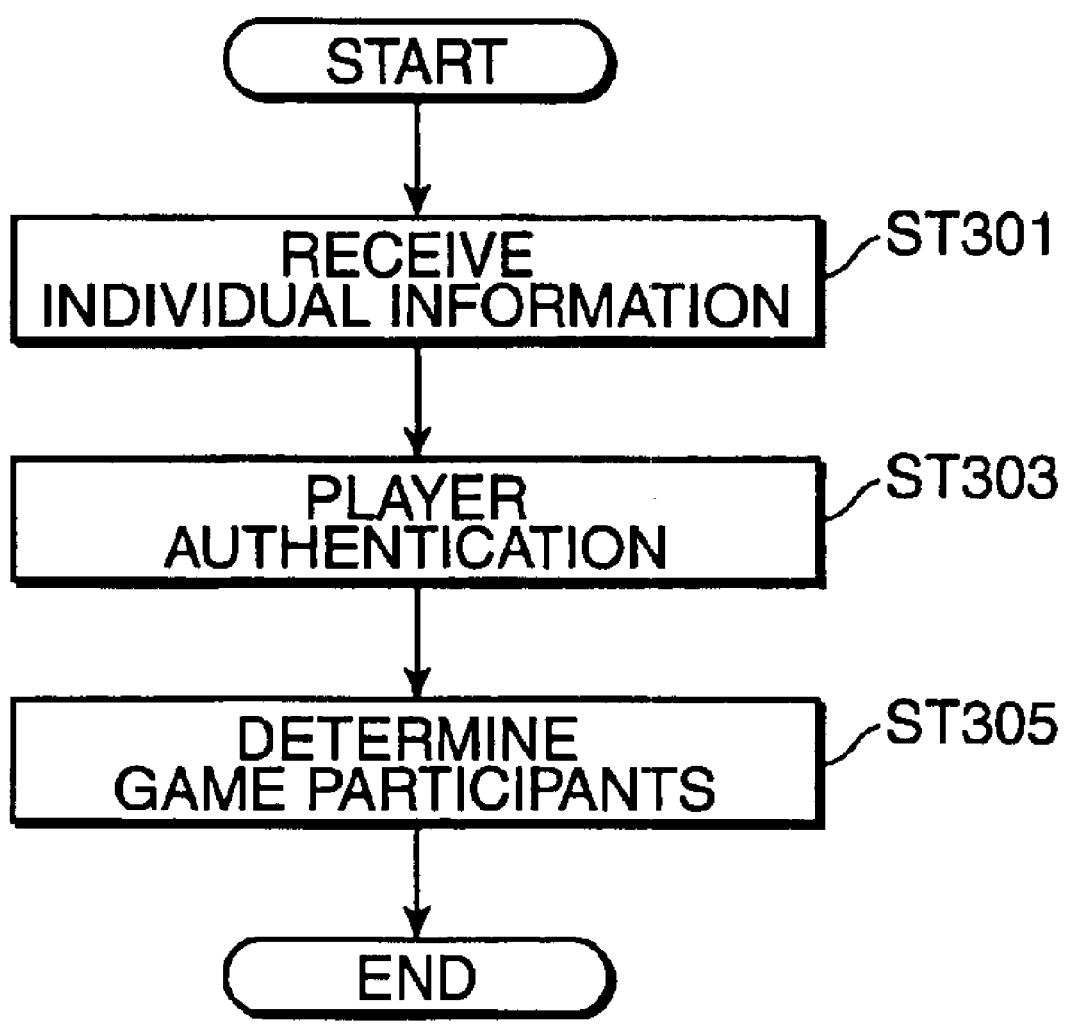
FIG. 14 is an example of a flow chart showing the operation of a center server device.

FIG. 14 is an example of a flow chart expressing the operation of the center server device 3. First of all, on receipt of the individual information transmitted from the client terminal device 1 (step ST301) the acceptance section 361a allows participation of a player in a game (step ST303) in accordance with the player information that is stored in the player information storage section 362a.

The selection section 361 then selects, in accordance with the levels stored in the ranking storage section 362b and the nicknames stored in the nickname storage section 363c, two or more players to play in a common game space, from the players whose participation has been allowed and that have been accepted by the acceptance section 361a and the execution instruction section 361d transmits (step ST305) through the arcade's server device 2 to the client terminal device 1 employed by the selected player instruction information for executing the game in the common game space by the players selected by the selection section 361b.

The instruction information for executing a game in a common game space by the players selected by the selection section 361b includes instruction information for storing the table information (see FIG. 9) in the table storage section 262a in respect of the arcade's server device 2.

Figure 15:
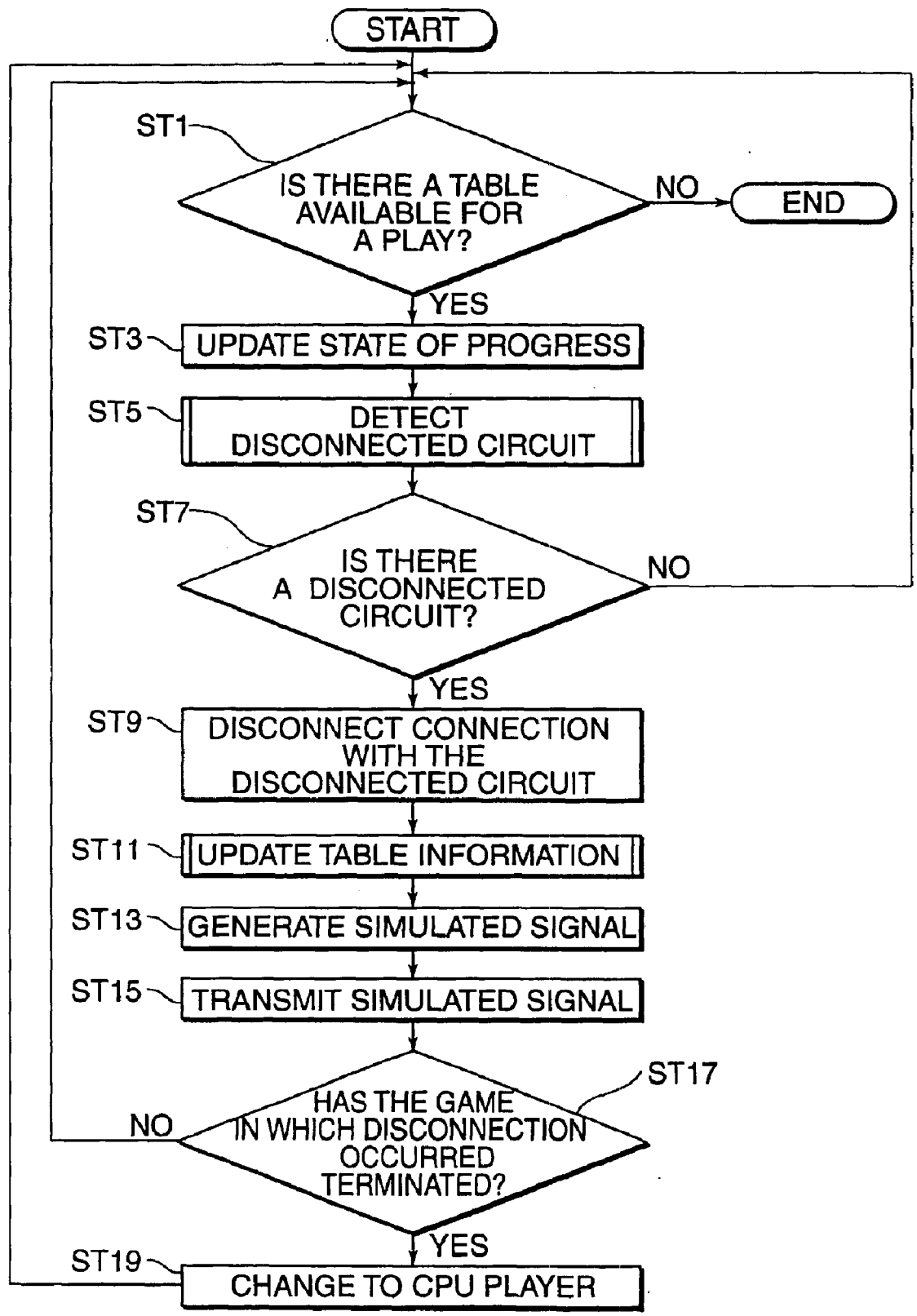
FIG. 15 is an example of a flow chart showing the operation of an arcade's server device 2 according to the present invention.

FIG. 15 is an example of a flow chart showing the operation of an arcade's server device 2 according to the present invention. First of all, the state of progress updating section 261a determines whether or not a table is available for a play, using the table information stored in the table storage section 262a (step ST1). If it is determined that no table is available for a play, processing is terminated. If it is determined that a table is available for a play, the state of progress updating section 261a updates the state of progress of the game stored in the state of progress storage section 262b in each table, using the table information stored in the table storage section 262a (step ST3).

Next, the abnormality monitoring section 261b detects disconnected circuits i.e. communication circuits that are incapable of communication, of the communication circuits that are necessary for communication in progress of the game (step ST5). The abnormality monitoring section 261b then determines whether or not any disconnected circuits have been detected (step ST7). If the result of this determination is negative, processing returns to step ST1, and the processing from step ST1 to step ST7 is repeated. If the result of this determination is positive, the circuit disconnection section 261c disconnects connection with the arcade's server device 2 that is connected through the disconnected circuit (step ST9).

Next, the simulated signal generating section 261d rewrites (step ST11) the table information corresponding to the client terminal device 1 that is connected through the communication circuit that has been detected as a disconnected circuit, of the table information stored in the table storage section 262a. Next, a simulated operation signal (simulated operation signal corresponding to "tsumokiri", an operation of picking up and immediately discarding the same) simulating the operation signals necessary for progress of the game from the client terminal device 1 that was connected through the disconnected circuit is generated by the simulated signal generating section 261d (step ST13). The simulated signal provision section 261e then transmits the simulated operation signal generated by the simulated signal generating section 261d to the client terminal device 1 connected through the private circuit with the arcade's server device 2 (step ST15).

Next, the game termination signal from the client terminal device 1 is used to determine whether or not the game had terminated at the time-point where the decision identifying a disconnected circuit was made a (step ST17). If this determination is negative, processing returns step ST1. If this determination is positive, the simulated signal generating section 261d rewrites the table information corresponding to the client terminal device 1 connected through the communication circuit that was identified as a disconnected circuit, of the table information stored in the table storage section 262a, and processing returns to step ST1, using the operation signal from this client terminal device 1 as the operation signal resulting from a virtual operation by the CPU player (step ST19).

Figure 16:
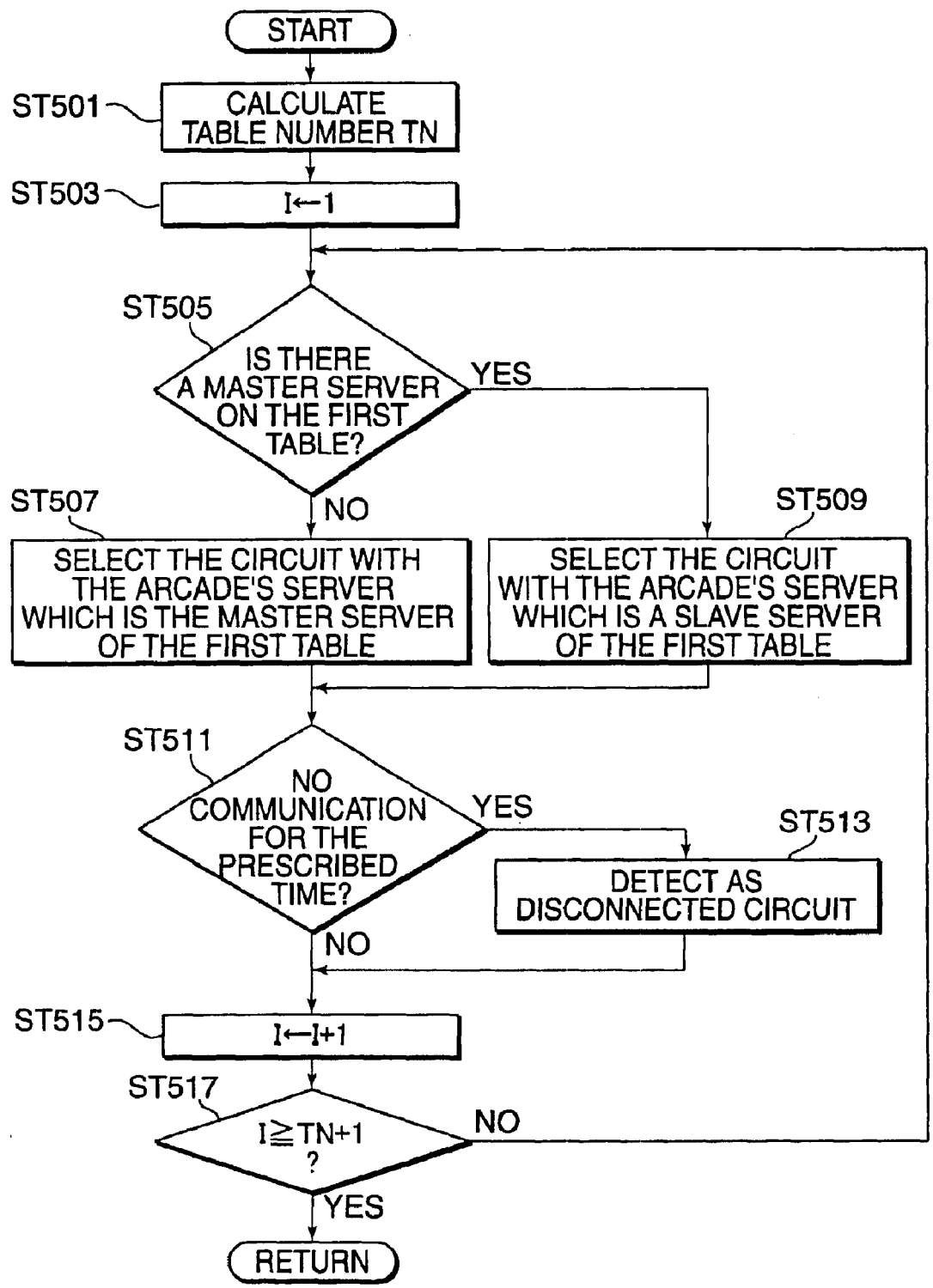
FIG. 16 is an example of a detailed flow chart of abnormality monitoring processing in step ST5 of the flow chart shown in FIG. 15.

FIG. 16 is a detailed flow chart of the abnormality monitoring processing in the step ST5 of the flow chart shown in FIG. 15. The following processing is performed by the abnormality monitoring section 261b. First of all, using the table information stored in the table storage section 262a, the table number TN, which is the number of the table at which the play is to be conducted, is calculated (step ST501). Next, a counter I is set to an initial value 1 (step ST503). Next, using the table information corresponding to the I-th table, which is the I-th table stored in the table storage section 262a, a determination is made (step ST505) as to whether or not the arcade's server device 2 in the I-th table is a master server. If it is determined that this server device 2 is a master server, the communication circuits between all of the arcade's server devices 2 that are set as slave servers in the I-th table are selected as communication circuits in respect of which a determination as to whether or not these are disconnected circuits is to be performed (step ST509) and processing advances to step ST511. If it is determined that the server in question is not a master server (i.e. is a slave server), the communication circuit with the arcade's server device 2 that is set as the master server in the I-th table is selected as a communication circuit in respect of which a determination should be made as to whether or not this circuit is disconnected (step ST509).

Next, in respect of the communication circuit selected in step ST507 or step ST509, a determination is made (step ST511) as to whether no communication has been effected by this communication circuit for a continuous prescribed period (in this case, 15 seconds). If the result of this determination is positive, the selected communication circuit is deemed to be a disconnected circuit (step ST513) and processing advances to step ST515. If the result of this determination is negative, the counter I is incremented (step ST515). A determination is then made (step ST517) as to whether or not the counter I is at least (TN+1) (i.e. as to whether or not disconnected circuit detection processing has been completed in respect of all of the tables). If the result of this determination is positive, return is executed; if the result of this determination is negative, processing advances to step ST505.

Figure 17:
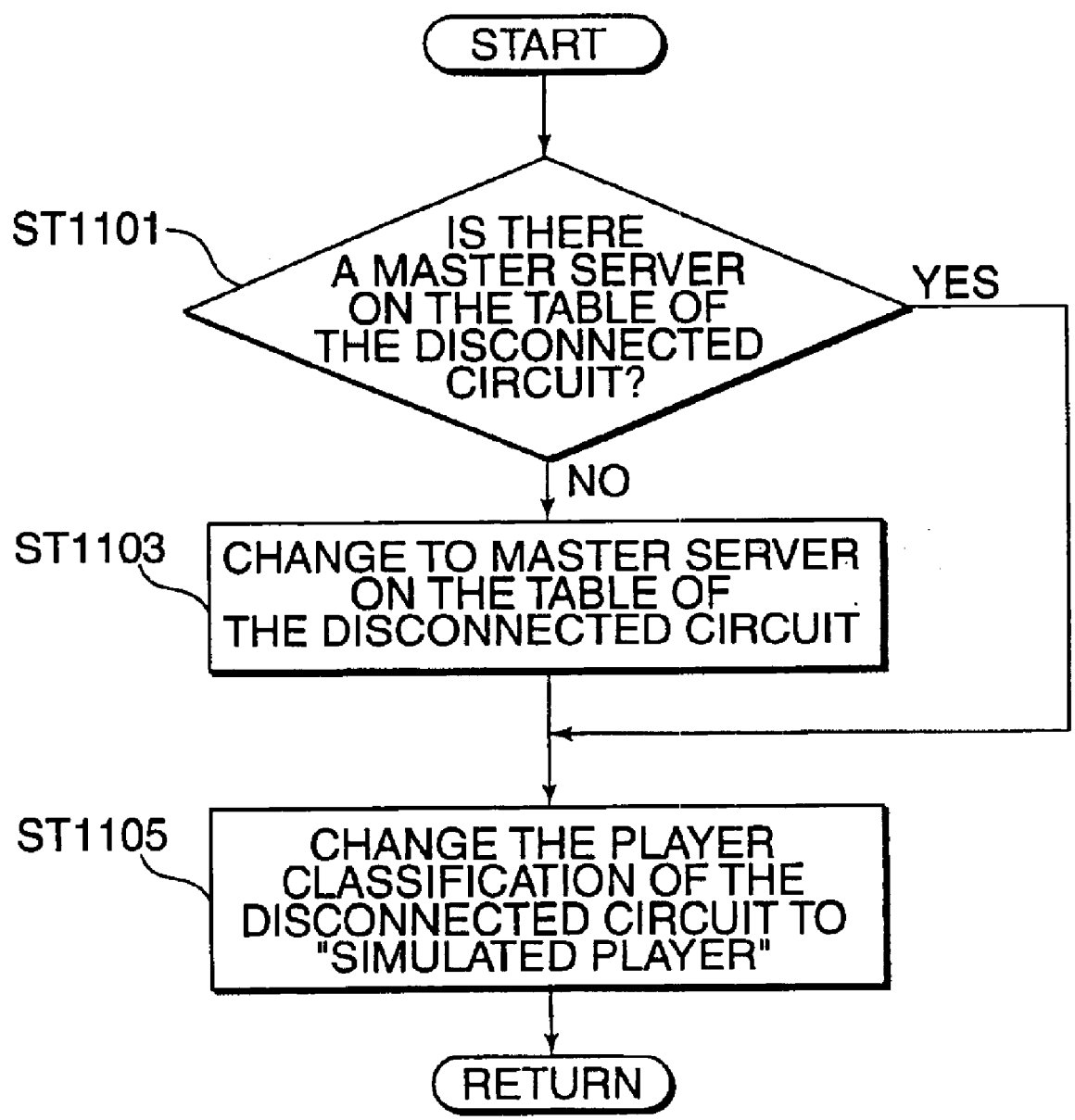
FIG. 17 is an example of a detailed flow chart of table information updating processing in step ST11 of the flow chart shown in FIG. 15.

FIG. 17 is an example of a detailed flow chart of the table information updating processing in step ST11 of the flow chart shown in FIG. 15. The following processing is performed by the simulated signal generating section 261d. First of all, a decision is made (step ST1101) as to whether or not the arcade's server device 2 in the table where a client terminal device 1 connected through a disconnected circuit is being used to play the game is a master server or not (whether the master/slave classification MS is "master server" or not), using the table information stored in the table storage section 262a. If the result of this determination is positive, processing advances to step ST1105. If the result of this determination is negative (case where the server is a slave server), the master/slave classification MS is altered to "master server" (step ST1103) and processing advances to step ST1105. The player classification PC corresponding to the client terminal device 1 that is connected through the disconnected circuit of the table information stored in the table storage section 262a is then altered to "simulated player" (step ST1105).

Figure 18:
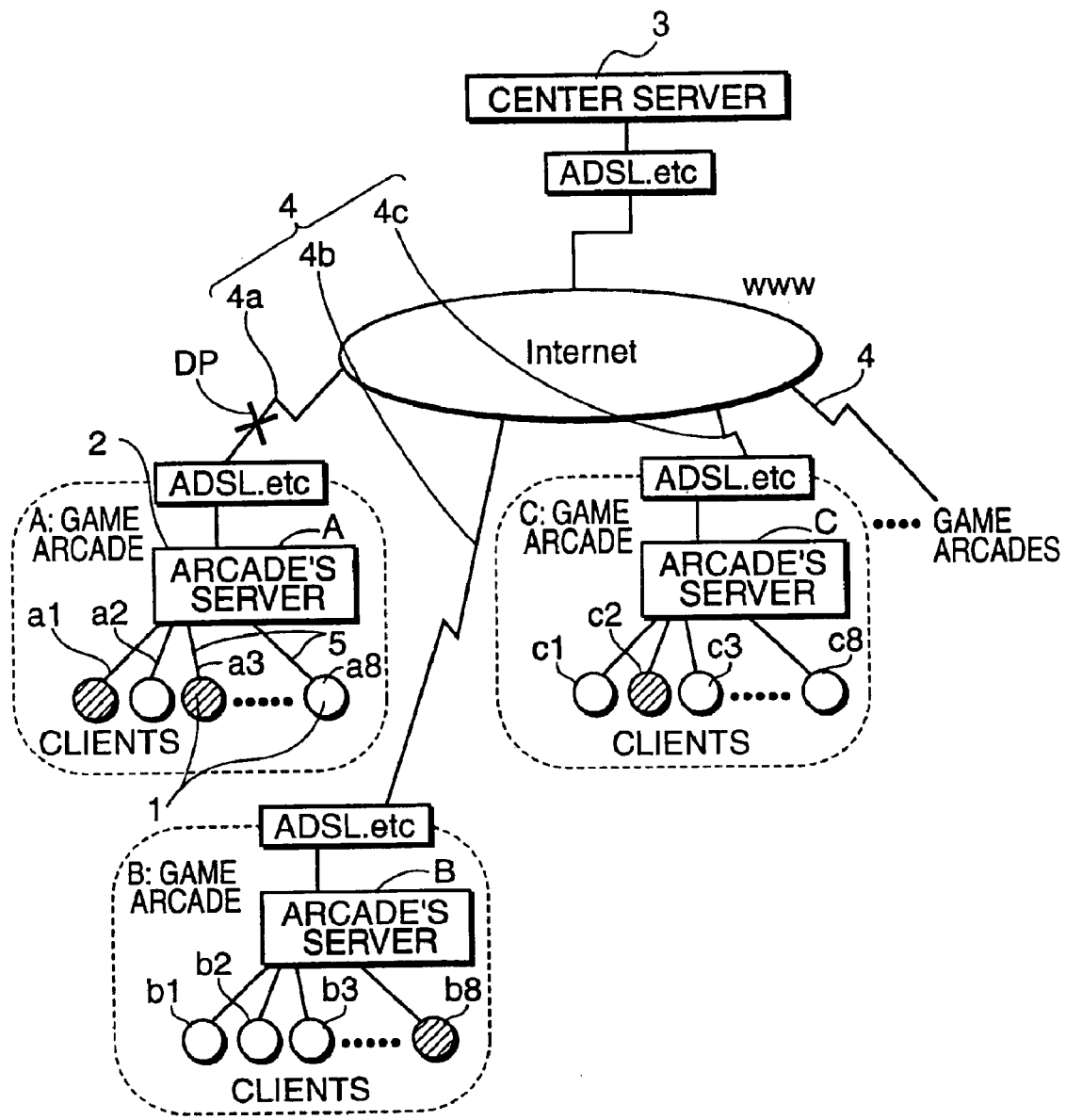
FIG. 18 is an example of a layout diagram of a game system when a circuit fault location has appeared.

A specific description will now be given of the details of updating processing of the table information for the case where a circuit fault location DP is generated in the communication circuit 4a between the arcade's server device A shown in FIG. 18 and the Internet WWW. When a circuit fault location DP is generated, communication of the arcade's server device A with the arcade's server devices B and C becomes impossible. FIGS. 19A to 19C are tables showing the table information when a circuit fault location DP is generated of the table (table number TN "1") constituted of the client terminal devices a1, a3, b8 and c2 shown in FIG. 18. FIG. 19A is a table showing the table information stored in the table storage section 262a of the arcade's server device A; FIG. 19B is a table showing the table information stored in the table storage section 262a of the arcade's server device B and FIG. 19C is a table showing the table information stored in the table storage section 262a of the arcade's server device C. The table information stored in the table storage section 262a of the arcade's server devices A, B and C prior to generation of the circuit fault location DP is the table content shown in FIG. 9.

First of all, the alteration processing of the table information stored in the table storage section 262a of the arcade's server device A will be described using FIG. 9 and FIG. 19A. The abnormality monitoring section 261b detects that the communication circuit between the arcade's server device A and the arcade's server devices B and C is disconnected and the simulated signal generating section 261d then alters the player classification PC of the table information corresponding to the client terminal device c2 that is connected through the arcade's server device C with the client terminal device b8 connected through the arcade's server device B from "player" to "simulated player". The acceptance number RN, the client symbol CN, the arcade's server symbol SN and the master/slave classification MS of the row where the player classification PC was altered to "simulated player" are then deleted and the acceptance numbers RN of the other rows are renumbered in the order of the original acceptance numbers RN. On receipt of an operation signal of the "simulated player" from the simulated signal generating section 261d based on the table information shown in FIG. 19A, the state of progress updating section 261a of the arcade's server device A updates the state of progress of the game stored in the state of progress storage section 262b. The game progress control sections 161a of the client terminal devices a1 and a3 that are connected through private circuits with the arcade's server device A then proceed with the game in accordance with the state of progress stored in the state of progress storage section 262b of the arcade's server device A. That is, the game is conducted such that the client terminal devices a1 and a3 and the two "simulated players" play in a common game space.

Next, alteration processing of the table information stored in the table storage section at 262a of the arcade's server device B will be described with reference to FIG. 9 and FIG. 19B. When the abnormality monitoring section 261b detects that the communication circuit between the arcade's server device B and the arcade's server device A is a disconnected circuit, the simulated signal generating section 261d alters the master/slave classification MS corresponding to the arcade's server device B to "master server" and alters the classification PC of the table information corresponding to client terminal devices a1, a3 and c2 that are connected through the arcade's server device A from "player" to "simulated player". The order of acceptance RN, client symbol CN, arcade's server symbol SN and master/slave classification MS of the row where the player classification PC was altered to "simulated player" are deleted and the order of acceptance RN of the other rows is reset to the number of the original order of acceptance RN. On receiving an operation signal "simulated player" from the simulated signal generating section 261d in accordance with the table information shown in FIG. 19B, the state of progress updating section 261a of the arcade's server device B updates the state of progress of the game stored in the state of progress storage section 262b. The game progress control section 161a of the client terminal device b8 that is connected through the private circuit with the arcade's server device B then advances the game in accordance with the state of progress stored in the state of progress storage section 262b of the arcade's server device B. Specifically, the game is advanced such that the three "simulated players" and the client terminal device b8 are playing in a common game space.

Next, the procedure for altering the table information stored in the table storage section 262a of the arcade's server device C will be described with reference to FIG. 9 and FIG. 19C. When the abnormality monitoring section 261b detects that the communication circuit between the arcade's server device C and at the arcade's server device A is a disconnected circuit, the simulated signal generating section 261d alters the master/slave classification MS corresponding to the arcade's server device C to "master server" and alters the player classification PC of the table information corresponding to the client terminal devices a1, a3 and b8 connected through the arcade's server device A from "player" to "simulated player". The acceptance number RN, the client symbol CN, the arcade's server symbol SN and the master/slave classification MS of the row where the player classification PC was altered to "simulated player" are then deleted and the acceptance number RN of the other rows are renumbered in the order of the original acceptance number RN. On receipt of an operation signal of the "simulated player" from the simulated signal generating section 261d based on the table information shown in FIG. 19C, the state of progress updating section 261a of the arcade's server device C updates the state of progress of the game stored in the state of progress storage section 262b. The game progress control sections 161a of the client terminal device c2 that is connected through a private circuit with the arcade's server device C then proceeds with the game in accordance with the state of progress stored in the state of progress storage section 262b of the arcade's server device C. That is, the game is conducted such that the client terminal device c2 and the three "simulated players" play in a common game space.

Next, alteration processing of the table information stored in the table storage section at step ST19 of the flow chart shown in FIG. 15 will be described with reference to FIG. 19 and FIG. 20. FIGS. 20A to 20C are tables showing the table information after alteration processing of the table (table number TN "1") constituted of the client terminal devices a1, a3, b8 and c2 shown in FIG. 18. FIG. 20A is a table showing the table information stored in the table storage section 262a of the arcade's server device A; FIG. 20B is a table showing the table information stored in the table storage section 262a of the arcade's server device B and FIG. 20C is a table showing the table information stored in the table storage section 262a of the arcade's server device C. The details of the table information prior to alteration processing are shown in FIG. 19.

First of all, the alteration processing of the table information stored in the table storage section 262a of the arcade's server device A will be described using FIG. 19A and FIG. 20A. When the simulated signal generating section 261d receives a "game terminated" signal from the client terminal device a1, if the player classification PC of the table information is "simulated player", this is altered to "CPU player". The client symbol CN, arcade's server symbol SN and master/slave classification MS of the row (in this case, the second row) corresponding to the client terminal device 1 (in this case, the client terminal device a1), whose acceptance number is "1" are respectively inserted in the client symbol CN, arcade's server symbol SN and master/slave classification MS of the rows (in this case, the fourth and fifth rows) in which the player classification PC is altered to "CPU player". The state of progress updating section 261a of the arcade's server device A updates the state of progress of the game stored in the state of progress storage section 262b on receipt of an operation signal "CPU player" generated by the CPU player section 161b of the client terminal device a1 in accordance with the table information shown in FIG. 20A in accordance with instructions from the simulated signal generating section 261d. The game progress control sections 161a of the client terminal devices a1 and a3 that are connected through private circuits with the arcade's server device A then proceed with the game in accordance with the state of progress stored in the state of progress storage section 262b of the client server device A. The game is proceeded with, with the two "CPU players" and the client terminal devices a1 and a3 treated as players in a common game space. The operation signal of the "CPU player" is generated by the CPU player section 161b of the client terminal device a1.

Next, the processing of alteration of the table information stored in the table storage section 262a of the arcade's server device B will be described with reference to FIG. 19B and FIG. 20B. On receiving the "game terminated" signal from the client terminal device a1, if the player classification PC of the table information is "simulate player" the simulated signal generating section 261d alters this classification to "CPU player". The client symbol CN, arcade's server symbol SN and master/slave classification MS of the row (in this case, the fourth row) corresponding to the client terminal device 1 (in this case, the client terminal device b8), whose acceptance number is "1" are respectively inserted in the client symbol CN, arcade's server symbol SN and master/slave classification MS of the rows (in this case, the second, third and fifth rows) in which the player classification PC was altered to "CPU player". The state of progress updating section 261a of the arcade's server device B updates the state of progress of the game stored in the state of progress storage section 262b on receipt of an operation signal "CPU player" generated by the CPU player section 161b of the client terminal device b8 in response to an instruction from the simulated signal generating section 261d, using the table information shown in FIG. 20B. The game progress control section 161a of the client terminal device b8 that is connected through the private circuit with the arcade's server device B advances the game in accordance with the state of progress stored in the state of progress storage section 262b of the arcade's server device B. Specifically, the game is proceeded with the three "CPU" and the client terminal device b8 playing in a common game space.

Next, the processing of alteration of the table information stored in the table storage section 262a of the arcade's server device C will be described using FIG. 19C and FIG. 20C. If the player classification PC of the table information is "simulated player", the simulated signal generating section 261d alters this classification to "CPU player" on receipt of the "game terminated" signal from the client terminal device c2. The client symbol CN, arcade's server symbol SN and master/slave classification MS of the row (in this case, the fifth row) corresponding to the client terminal device 1 (in this case, the client terminal device c2), whose acceptance number is "1" are respectively inserted in the client symbol CN, arcade's server symbol SN and master/slave classification MS of the rows (in this case, the second, third and fourth rows) in which the player classification PC was altered to "CPU player". The state of progress updating section 261a of the arcade's server device C updates the state of progress of the game stored in the state of progress updating section 262b on receipt of the operation signal "CPU player" generated by the CPU player section 161b of the client terminal device c8 in response to an instruction from the simulated signal generating section 261d, using the table information shown in FIG. 20C. The game progress control section 161a of the client terminal device c2 that is connected through the private circuit with the arcade's server device C advances the game in accordance with the state of progress stored in the state of progress storage section 262b of the arcade's server device C. Specifically, the game is proceeded with the three "CPU players" and the client terminal device c2 playing in a common game space.

In this way, if a disconnected circuit is generated, the game is continued in simulated fashion with the player of the client terminal device 1 that was connected through the disconnected circuit changed to "simulated player". Accordingly, even if a fault is generated in a communication circuit, a network game is realized that can be continuously enjoyed by the players without interruption of the game and so without loss of interest in the game caused by communication failures. Furthermore, since the "simulated player" is a virtual player that performs immediate pickup and discard of tiles, processing is straightforward and the load on the CPU 261 of the arcade's server device 2 is alleviated.

Also, when a game (in this case, east wind, first game) is terminated, the player of the client terminal device 1 that was connected through the disconnected circuit is altered from "simulated player" to "CPU player" and the game is continued in simulated fashion. The "CPU player" apparently performs similar operations (outputs operation signals) to human players, so the game can be continued with even less feeling of incongruity by the players.

Figure 21:
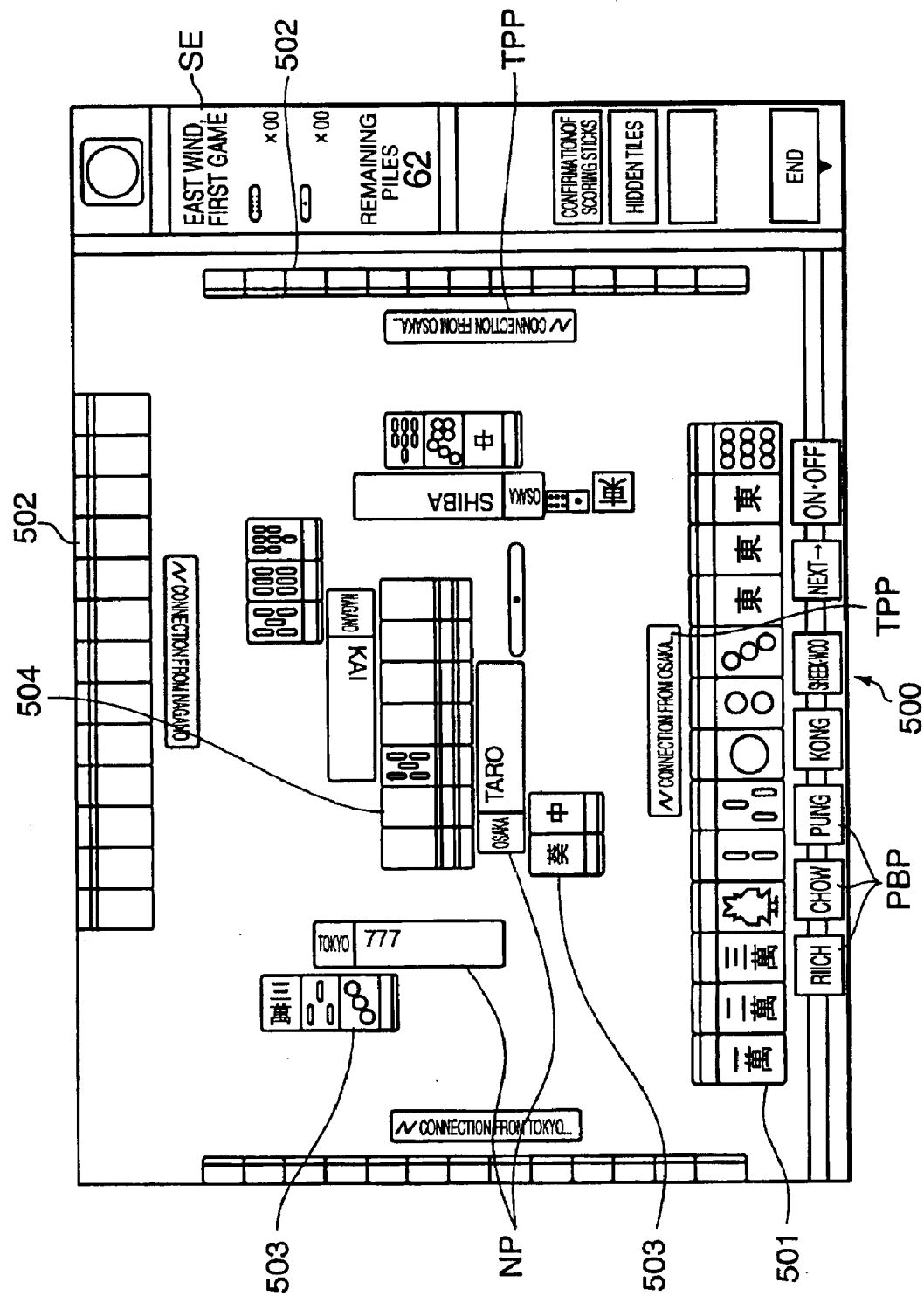
FIG. 21 is an example of a screen view of a contest screen showing the state of a contest when no circuit failure has occurred.

FIG. 21 is an example of a game play screen showing the state of a game, when a disconnected circuit is generated. As shown in FIG. 8, this game play screen 500 is a screen view of the game play screen 500 displayed on the client terminal device a1 when client terminal devices a1 and a3 connected through the private circuit 5 with the arcade's server device A, the client terminal device b8 connected through the private circuit 5 with the arcade's server device B and the client terminal device c2 connected through the private circuit 5 with the arcade's server device C are conducting a game in a common game space. In this case, for convenience, it is assumed that the client terminal devices a1, a3, b8 and c2 are respectively provided at "Osaka", "Osaka", "Nagano" and "Tokyo".

In the game play screen 500, a player's wall 501 is displayed in the lower part of the screen in such a way that the type of the tiles can be seen; opponents' walls 502 are displayed in the upper part and the left and right parts of the screen in such a way that the type of the tiles cannot be seen; a pile 504 containing the "dora" display tiles is displayed in substantially the middle of the screen; discard tiles 503 are displayed around the pile 504; various types of buttons PBP that may be pressed by the player are displayed in the lower part of the screen; and a game display area SE that displays the progress of the game is displayed on the right-hand side at the top of the screen. The player depresses an appropriate button PBP while viewing the game play screen 500 and the game proceeds as the resulting operation is accepted. It can be seen that the state of progress of the game is "east wind, first game" since "east wind, first game" is displayed in the game display area SE.

In addition, the game play screen 500 displays, between the player walls 501, 502 and the discarded tiles 503, a location display area TPP that shows the location of the arcade's server device 2 that is connected through the private circuit with the client terminal device 1 that is being operated by the respective players. For example, the player location display area TPP displays "connection from Osaka", so it can be seen that the player is conducting the game using a client terminal device 1 in Osaka and the location display area TPP of the opponent who is on the left of the player is displaying "connection from Tokyo", so it can be seen that the opponent is playing the game using a client terminal device 1 which is in Tokyo.

In addition, between the discarded tiles 503 and the pile 504 of the players, the game play screen 500 displays a player information display area NP that displays player information of each player such as the players' nicknames during the game. For example, it can be seen that the player's player information display area NP displays "Taro" and the nickname of this player during the game is "Taro". Also, the locations of the client terminal device 1 that are being operated by each player are displayed at the left-hand ends of the player information display areas NP.

Figure 22:
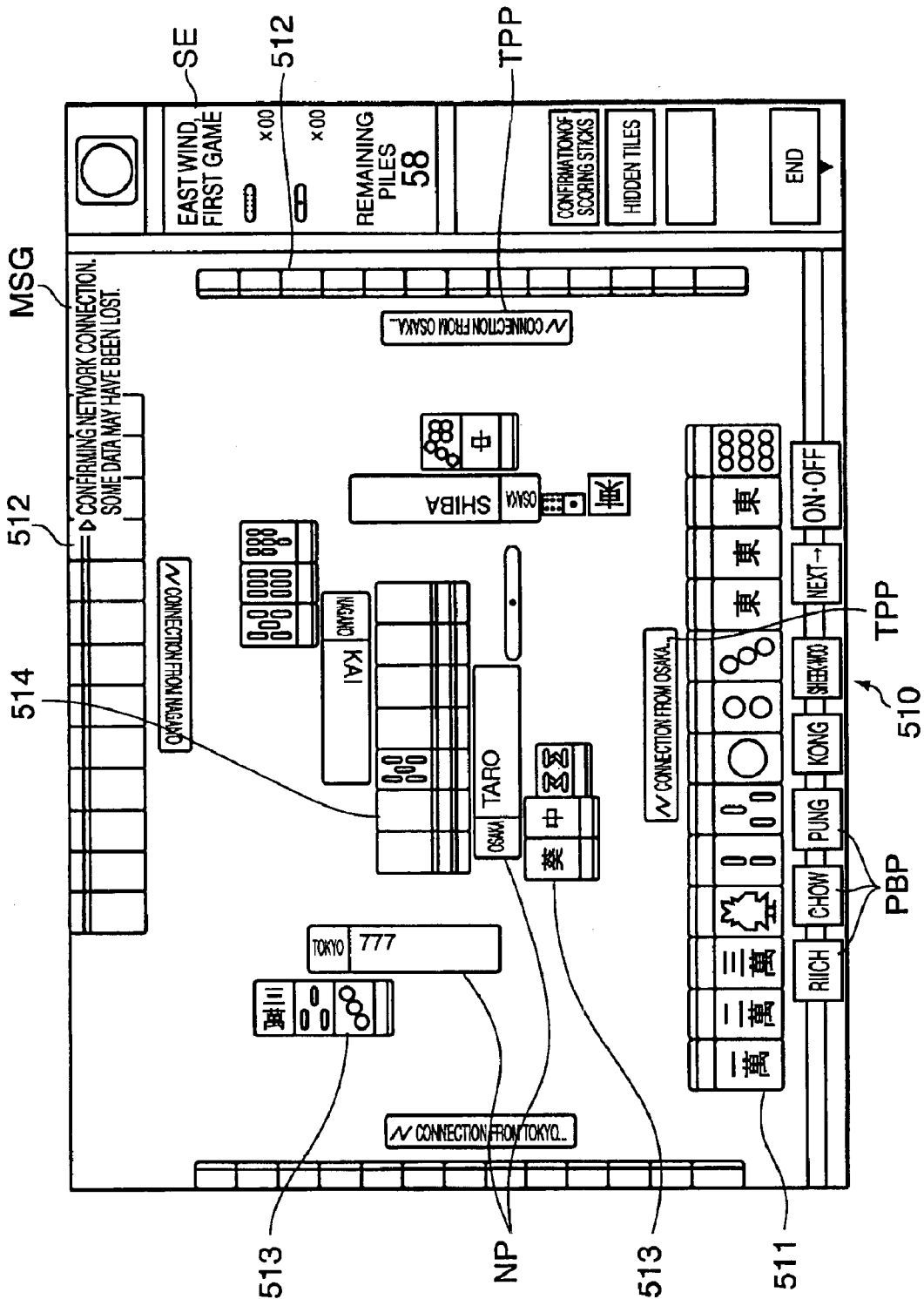
FIG. 22 is an example of a screen view of a contest screen showing the state of a contest when circuit failure has occurred.

FIG. 22 is an example of a screen view of a game play screen showing the state of the game when a disconnected circuit is generated. This game play screen 510, like that of FIG. 21, is a screen view of a game play screen displayed at the client terminal device a1 when a game is being conducted in a common game space by the client terminal devices a1, b8 and c2.

In the game play screen 510, a player's wall 511 is displayed in the lower part of the screen in such a way that the type of the tiles can be seen; opponents' walls 512 are displayed in the upper part and the left and right parts of the screen in such a way that the type of the tiles cannot be seen; a pile 514 containing the "dora" display tiles is displayed in substantially the middle of the screen; discard tiles 513 are displayed around the pile 514; various types of buttons PBP that may be pressed by the player are displayed in the lower part of the screen; and a game display area SE that displays the progress of the game is displayed on the right-hand side at the top of the screen.

In addition, the game play screen 510 displays, between the player walls 501, 502 and the discarded tiles 503, a location display area TPP that shows the location of the arcade's server device 2 that is connected through the private circuit with the client terminal device 1 that is being operated by the respective players and in addition, between the discarded tiles 503 and the pile 504 of the players, the game play screen 510 displays a player information display area NP that displays player information of each player such as the players' nicknames during the game.

In addition, the contest display screen 510 displays on the top right-hand side of the screen a message display area MSG that displays whether a disconnected circuit has been detected. From the fact that the message display area MSG displays "confirming network connection" it can be seen that abnormality has occurred in the connection condition of the network (in this case, a disconnected circuit has been detected).

Figure 23:
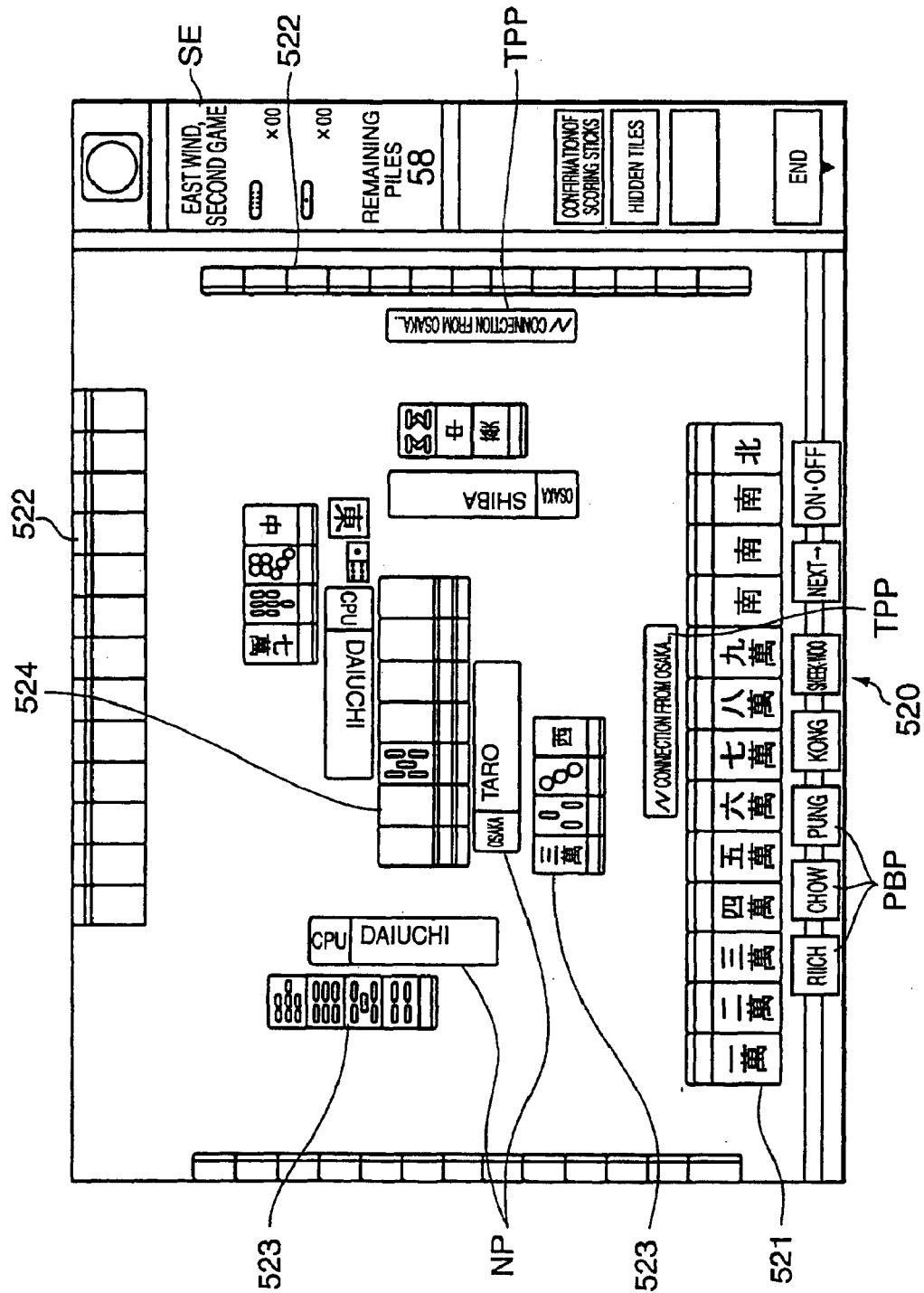
FIG. 23 is an example of a screen view when the contest screen representing the state of the contest has advanced to east wind, second game.

FIG. 23 is an example of a screen view of the game play screen showing the state of the game, when the game has advanced to east wind, second game. This game play screen 520, like that of FIG. 21, is a screen view of a game play screen displayed at the client terminal device a1 when a game is being conducted in a common game space by the client terminal devices a1, b8 and c2.

In the game play screen 520, a player's wall 521 is displayed in the lower part of the screen in such a way that the type of the tiles can be seen; opponents' walls 522 are displayed in the upper part and the left and right parts of the screen in such a way that the type of the tiles cannot be seen; a pile 524 containing the "dora" display tiles is displayed in substantially the middle of the screen; discard tiles 523 are displayed around the pile 524; various types of buttons PBP that may be pressed by the player are displayed in the lower part of the screen; and a game display area SE that displays the progress of the game is displayed on the right-hand side at the top of the screen. It can be seen that the state of progress of the game is "east wind, second game" since "east wind, second game" is displayed in the game display area SE.

In addition, the game play screen 510 displays, between the player walls 521, 522 and the discarded tiles 523, a location display area TPP that shows the location of the arcade's server device 2 that is connected through the private circuit with the client terminal device 1 that is being operated by the respective players. The player information display area NP that displays player information such as the nickname of each player in the game is displayed between each player's discard tiles 503 and the pile 504. The location display area TPP of the opponents i.e. the player on the left-hand side and the player on the opposite side is not displayed and "CPU" is displayed on the left-hand side of the player information display area NP, so it can be seen that these players are changed to "CPU players".

Further embodiments of the present invention are as follows.

(A) In the present embodiment, the case was described in which the game that is performed by the client terminal devices 1 is a mahjong game, but the present invention could be applied to other games played by a plurality of players. For example, it could be applied to card games, Go games, chess games, shooting games or race games or the like.

(B) In this embodiment, the case was described in which arcade's server devices 2 were provided. However, an embodiment is also possible in which the client terminal devices 1 are connected to the center server device 3 through communication circuits. In this case, the client terminal devices 1 must be provided with a game progress management section 2611 according to the present invention (abnormality monitoring section 261b, simulated signal generating section 261d and simulated signal provision section 261e).

The functions of the abnormality monitoring section 261b, simulated signal generating section 261d and simulated signal provision section 261e in this case will now be described. The abnormality monitoring section 261b detects a disconnected circuit, which is a communication circuit that is incapable of communication, from among the communication circuits between a client terminal device 1 and the other client terminal devices 1 that are playing in a common game space.

The simulated signal generating section 261d generates a simulated operation signal that simulates the necessary operation signal for proceeding with the game of the client terminal device 1 that is connected through the disconnected circuit. The simulated signal provision section 261e outputs the simulated operation signal generated by the simulated signal generating section 261d to the game progress control section 161a and other sections.

(C) In this embodiment, the case where the abnormality monitoring section 261b detects a communication circuit that fails to communicate continuously for a prescribed period as being a disconnected circuit is described, but an embodiment is also possible in which a disconnected circuit is detected by some other method. For example, the method is also possible in which a signal to request transmission of a prescribed reply signal is transmitted to the arcade's server device 2 (or client terminal 1) that is connected by a communication circuit and a disconnected circuit is detected by whether or not the prescribed reply signal is received.

(D) In this embodiment, the case was described in which a simulated operation signal is generated corresponding to the CPU player, on receipt of a "game terminated" signal after generation of a simulated operation signal corresponding to "tsumokiri" by the simulated signal generating section 261d, but an embodiment could be employed in which another simulated operation signal is generated. For example, an embodiment could be employed in which a simulated operation signal is generated corresponding to "tsumokiri" until termination of the play or an embodiment could be employed in which a simulated operation signal is generated corresponding to the CPU player until termination of the play.

(E) In this embodiment, the case was described in which a client terminal device 1 was provided with a CPU player section 161b generating a simulated operation signal corresponding to a CPU player. However, an embodiment could be employed in which the arcade's server device 2 is provided with a CPU player section 161b.

(F) In this embodiment, the case was described in which a simulated operation signal was generated corresponding to "tsumokiri" by the simulated signal generating section 261d of the arcade's server device 2. However, an embodiment could be employed in which a simulated operation signal is generated corresponding to "tsumokiri" by a client terminal device 1.

In summary, the present invention takes a form of a game progress management device to which a prescribed number of terminal devices that receive operations from players are connected through communication circuits so as to be capable of mutual communication of operation signals necessary for proceeding with a game and whereby the progress of a network game that is conducted in a common game space is managed and the network game is continued in simulated fashion if a fault is generated in the communication circuits. The game progress management device of the present invention comprises: abnormality monitoring means that detects a disconnected circuit in which failure of communication has occurred from the communication circuits of the prescribed number of terminal devices during progress of the game in the common game space; simulated signal generating means that generates a simulated operation signal that simulates the operation signal of each terminal device connected through the disconnected circuit; and simulated signal providing means that provides the simulated operation signal that is thus generated to the other terminal devices, respectively.

With the invention as described above, the abnormality monitoring means detects a disconnected circuit in which failure of communication has occurred from the communication circuits between the prescribed number of terminal devices during progress of the game in a common game space and the simulated signal generating means generates a simulated operation signal that simulates the operation signals of each of the terminal devices connected through the disconnected circuit and the simulated signal providing means provides (for example, transmits) the simulated signal that is thus generated to the other terminal devices, respectively.

Thus, if a fault or the like occurs in a communication circuit, causing a disconnected circuit to be generated from the communication circuits between the prescribed number of terminal devices that are conducting the game in a common game space, a simulated operation signal is provided that simulates the operation signals of each of the terminal devices that are connected through this disconnected circuit, so the other terminal devices can continue the network game in simulated fashion using this simulated operation signal. As a result, loss of interest and confidence in the network game caused by communication failures can be prevented and a network game can thereby be realized that can be continuously enjoyed by the players.

The aforementioned game progress management device may further comprise circuit disconnection means that disconnects the connection with the terminal device connected through the disconnected circuit.

With this invention, transmission of noise signals from a terminal device connected through a disconnected circuit can be reliably prevented, thanks to the circuit disconnection means disconnecting the connection with the terminal device connected through the disconnected circuit, thereby stabilizing the operation of the game progress management device.

In the aforementioned game progress management device, the abnormality monitoring means detects a communication circuit that continuously fails to communicate for a prescribed time as being a disconnected circuit.

With this invention, a disconnected circuit can be easily and accurately detected thanks to the abnormality monitoring means detecting a communication circuit that continuously fails to communicate for a prescribed time as being a disconnected circuit.

Furthermore, the present invention takes a form of a game server device employed in an network game system which comprises: terminal devices that receive operations from players; game server devices to which a plurality of terminal devices are connected so as to be capable of communication through a private circuit; and a center server device to which a plurality of game server devices are connected so as to be capable of communication through communication circuits, and which conducts a network game played by a prescribed number of players in a common game space. The game server device according to the present invention comprises a game progress management device as described in the above paragraphs, wherein the simulated signal generating means generates a simulated operation signal corresponding to a terminal device connected through the disconnected circuit and another game server device, and the simulated signal providing means transmits the simulated operation signal that is thus generated to a terminal device through a private circuit.

With the above invention, the game progress management device, the simulated signal generating means generates a simulated operation signal corresponding to a terminal device that is connected through a disconnected circuit and another game server device and the simulated signal providing means transmits this simulated operation signal that has been thus generated to the terminal device through a private circuit.

Consequently, a game server device is realized whereby, if a fault is generated in a communication circuit, causing a disconnected circuit to be generated from the communication circuits between the prescribed number of terminal devices that are conducting a game in a common game space, a terminal device that was connected through the private circuit with the game server device can continue the network game in simulated fashion.

The aforementioned game server device may further comprise state of progress storage means that stores information relating to the state of progress of the network game, and state of progress updating means that updates information relating to the state of progress stored in the state of progress storage means, by exchanging signals with the terminal devices that are conducting a game in a common game space, with prescribed timing.

With the above invention, the state progress storage means stores information relating to the state of progress of the network game and the state of progress updating means updates information relating to the state of progress stored in the state of progress storage means by exchanging signals with a prescribed timing with the terminal devices that are conducting a game in a common game space.

Consequently, the terminal devices that are connected through the private line with the game server device can proceed with the network game using the information relating to the state of progress of the network game stored by the state of progress storage means, so matching the state of progress of the network game between each terminal device that is conducting the game in the common game space in regard to time (synchronization) can easily be achieved.

In the aforementioned game server device, the network game is a game modeled on mahjong and the simulated signal generating means generates a simulated operation signal corresponding to virtual operation of "tsumokiri" to pick up a tile and immediately discard the same.

With the above features, the network game is a game modeled on mahjong and the simulated signal generating means generates a simulated operation signal corresponding to virtual operation of "tsumokiri". In an actual mahjong game, "tsumokiri" occurs frequently, so the network game can be continued in a simulated fashion without any feeling of incongruity by the player when a disconnected circuit is produced. Furthermore, "tsumokiri" is a simple operation in which the tile that has been picked up is simply selected as a discard tile, so the simulated operation signal can easily be generated so the load on the processor is alleviated.

In addition, in the aforementioned game server device, the network game is a game modeled on mahjong and the simulated signal generating means generates the operation signal when a terminal device accepts virtual operations by a CPU player as the simulated operation signal.

With the above feature, the simulated signal generating means generates the operation signal when a terminal device accept operations by a virtual CPU player as the simulated operation signal. Since the CPU player selects discard tiles taking into account for example the type of wall and number of tiles and the type of tile that has been picked up in the same way as a human player, the network game can be continued in simulated fashion with even less feeling of incongruity on the part of the player when a disconnected circuit is produced.

Furthermore, in the game server device as mentioned above, the network game is a game modeled on mahjong in which there are a plurality of game stages and the simulated signal generating means generates a simulated operation signal corresponding to virtual "tsumokiri" if the time-point where the abnormality monitoring means detects a disconnected circuit falls in the period of a game, and generates an operation signal when a terminal device accepts virtual operations by a CPU player as the simulated operation signal if the time-point where the abnormality monitoring means detects a disconnected circuit is after the termination of a game.

With the above invention, the network game is a game modeled on mahjong in which there are a plurality of game stages and the simulated signal generating means generates the operation signal corresponding to virtual operation of "tsumokiri" if the time-point where the abnormality monitoring means detects a disconnected circuit falls in the period of a game, and generates the operation signal when a terminal device accepts operations by a virtual CPU player as the simulated operation signal if the time-point where the abnormality monitoring means detects a disconnected circuit is after the termination of a game.

At the time point where the abnormality monitoring means detects a disconnected circuit, there is a change in the content of processing by the processor, so the load on the processor may be temporarily increased. Accordingly, if this time-point is within the period of the game, the simulated signal generating means generates a simulated operation signal corresponding to virtual "tsumokiri", so the load on the processor is alleviated. Furthermore, if this time-point is after termination of a game, the operation signal when the terminal device accepts operation of a virtual CPU player is generated as the simulated operation signal, so if a disconnected circuit is produced, the network game is continued in simulated fashion with even less feeling of incongruity on the part of the player. That is, if a disconnected circuit is produced, the load on the processor is alleviated and the network game is continued in simulated fashion without giving the players a feeling of incongruity.

Moreover, the present invention takes a form of a terminal device employed in an network game system which comprises terminal devices that accept operations by players and a game server device to which a plurality of terminal devices are connected so as to be capable of communication through communication circuits, and which conducts a network game played by a prescribed number of players in a common game space, and the terminal device comprises a game progress management device in any form as mentioned in the above paragraphs.

With the above invention, since a game progress management device is in any form as described in the above paragraphs, a terminal device can be realized wherein, if a fault or the like occurs on a communication circuit, producing a disconnected circuit in the communication circuits between the plurality of terminal devices that are conducting a game in a common game space, the network game can be continued in simulated fashion.

Furthermore, the present invention relates to a method of game progress management employing a game progress management device to which a prescribed number of terminal devices that accept operations from players are connected so as to be capable of mutual communication of the operation signals necessary for the progress of the game through communication circuits and which manages the progress of a network game conducted in a common game space and continues the network game in simulated fashion if a fault is generated in the communication circuits, wherein the game progress management device is made to execute: abnormality monitoring processing of detecting a disconnected circuit in which inability to communicate has occurred from the communication circuits between the prescribed number of terminal devices during progress of the game in a common game space; simulated signal generating processing of generating a simulated operation signal that simulates an operation signal of each terminal device connected through the disconnected circuit; and simulated signal provision processing of providing the simulated operation signal that was thus generated to the other terminal devices.

With the above invention, the abnormality monitoring processing detects a disconnected circuit in which failure of communication has occurred from the communication circuits between the prescribed number of terminal devices that are conducting a game in a common game space and the simulated signal generating processing generates a simulated operation signal that simulates the operation signals of each of the terminal devices connected through the disconnected circuit and the simulated signal provision processing provides the simulated operation signal that is thus generated to the other terminal devices.

Thus, if a fault or the like occurs in a communication circuit, causing a disconnected circuit to be generated from the communication circuits between the prescribed number of terminal devices that are conducting the game in a common game space, a simulated operation signal is transmitted that simulates the operation signals of each of the terminal devices that are connected through this disconnected circuit, so the other terminal devices can continue the network game in simulated fashion using this simulated operation signal. As a result, loss of interest and confidence in the network game caused by communication failures can be prevented and a network game can thereby be realized that can be continuously enjoyed by the players.

Yet, furthermore, the present invention relates also to game progress management for a game progress management device to which a prescribed number of terminal devices that accept operations from players are connected so as to be capable of mutual communication of the operation signals necessary for the progress of the game through communication circuits and which manages the progress of a network game conducted in a common game space and continues the network game in simulated fashion if a fault is generated in the communication circuits, the game progress management program being for making the game progress management device function as: abnormality monitoring means for detecting a disconnected circuit in which inability to communicate has occurred from the communication circuits between the prescribed number of terminal devices during progress of the game in a common game space; simulated signal generating means for generating a simulated operation signal that simulates an operation signal of each terminal device connected through the disconnected circuit; and simulated signal providing means for providing the simulated operation signal that was thus generated respectively to the other terminal devices.

With the invention in the above form, the abnormality monitoring means detects a disconnected circuit in which inability to communicate has occurred in a communication circuit of the communication circuits between the prescribed number of terminal devices during progress of the game in a common game space. The simulated signal generating means generates a simulated operation signal that simulates an operation signal of each terminal device connected through the disconnected circuit. And the simulated signal providing means provides the simulated operation signal that was thus generated respectively to the other respective terminal devices.

Consequently, if a fault or the like occurs in a communication circuit, causing a disconnected circuit to be produced in the communication circuits between the prescribed number of terminal devices that are conducting a game in a common game space, since a simulated operation signal is provided that simulates the operation signals of each of the terminal devices that were connected through the disconnected circuit, the other terminal devices can continue the network game in simulated fashion using this simulated operation signal. As a result, a network game is realized that can be continuously enjoyed by the players without loss of interest and confidence in the game caused by communication failures.

This application is based on Japanese patent application serial no. 2002-215595, filed in Japan Patent Office on Jul. 24, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game progress management device to which a prescribed number of terminal devices that receive operations from players are connected through communication circuits so as to be capable of mutual communication of operation signals necessary for proceeding with a game and whereby a progress of a network game that is conducted in a common game space is managed and the network game is continued in simulated fashion if a fault occurs in the communication circuits, said game progress management device comprising:

abnormality monitoring means that detects a disconnected circuit in which failure of communication has occurred from the communication circuits of the prescribed number of terminal devices during the progress of the game in the common game space;

simulated signal generating means that generates a simulated operation signal that simulates the operation signal of each terminal device connected through said disconnected circuit; and simulated signal providing means that provides said simulated operation signal to the other terminal devices, respectively.

2. The game progress management device according to claim 1, further comprising circuit disconnection means that disconnects the connection with the terminal device connected through said disconnected circuit.

3. The game progress management device according to claim 1, wherein said abnormality monitoring means detects a communication circuit that continuously fails to communicate for a prescribed time as being the disconnected circuit.

4. A game server device in an network game system which comprises: terminal devices that receive operations from players; game server devices to which a plurality of terminal devices are connected so as to be capable of communication through a private circuit; and a center server device to which a plurality of the game server devices are connected so as to be capable of communication through communication circuits, and which conducts a network game played by a prescribed number of players in a common game space, said game server device comprising a game progress management device to which a prescribed number of the terminal devices that receive operations from the players are connected through the communication circuits so as to be capable of mutual communication of operation signals necessary for proceeding with a game and whereby a progress of the network game that is conducted in the common game space is managed and the network game is continued in simulated fashion if a fault occurs in the communication circuits, said game progress management device including:

abnormality monitoring means that detects a disconnected circuit in which failure of communication has occurred from the communication circuits of the prescribed number of the terminal devices during the progress of the game in the common game space;

simulated signal generating means that generates a simulated operation signal that simulates the operation signal of each terminal device connected through said disconnected circuit; and simulated signal providing means that provides said simulated operation signal to the other terminal devices, respectively, wherein said simulated signal generating means generates a simulated operation signal corresponding to a terminal device connected through said disconnected circuit and another game server device, and said simulated signal providing means transmits the simulated operation signal that is thus generated to a terminal device through the private circuit.

5. The game server device according to claim 4, further comprising:

state of progress storage means that stores information relating to the state of progress of the network game; and state of progress updating means that updates information relating to the state of progress stored in said state of progress storage means, by exchanging signals with the terminal devices that are conducting the game in the common game space, with prescribed timing.

6. The game server device according to claim 5, wherein the network game is a game modeled on mahjong and said simulated signal generating means generates the simulated operation signal corresponding to virtual "tsumokiri" operation of picking up a tile and immediately discarding the tile.

7. The game server device according to claim 5, wherein the network game is a game modeled on mahjong and said simulated signal generating means generates an operation signal when a terminal device accepts virtual operations by a CPU player as the simulated operation signal.

8. The game server device according to claim 5, wherein the network game is a game modeled on mahjong in which there are a plurality of game stages and said simulated signal generating means generates the simulated operation signal corresponding to virtual "tsumokiri" operation if the time-point where said abnormality monitoring means detects the disconnected circuit falls in the period of the game, and generates an operation signal when a terminal device accepts virtual operations by a CPU player as the simulated operation signal if the time-point where said abnormality monitoring means detects the disconnected circuit is after the termination of a game.

9. The game server device according to claim 4, wherein the network game is a game modeled on mahjong and said simulated signal generating means generates the simulated operation signal corresponding to virtual "tsumokiri" operation of picking up a tile and immediately discarding the tile.

10. The game server device according to claim 4, wherein the network game is a game modeled on mahjong and said simulated signal generating means generates an operation signal when a terminal device accepts virtual operations by a CPU player as the simulated operation signal.

11. The game server device according to claim 4, wherein the network game is a game modeled on mahjong in which there are a plurality of game stages and said simulated signal generating means generates the simulated operation signal corresponding to virtual "tsumokiri" operation if the time-point where said abnormality monitoring means detects the disconnected circuit falls in the period of the game, and generates an operation signal when a terminal device accepts virtual operations by a CPU player as the simulated operation signal if the time-point where said abnormality monitoring means detects the disconnected circuit is after the termination of a game.

12. A terminal device in an network game system which comprises terminal devices that accept operations by players and a game server device to which a plurality of the terminal devices are connected so as to be capable of communication through communication circuits, and which conducts a network game played by a prescribed number of players in a common game space, said terminal device comprising a game progress management device to which a prescribed number of the terminal devices that receive operations from the players are connected through the communication circuits so as to be capable of mutual communication of operation signals necessary for proceeding with a game and whereby a progress of the network game that is conducted in the common game space is managed and the network game is continued in simulated fashion if a fault occurs in the communication circuits, said game progress management device including:

abnormality monitoring means that detects a disconnected circuit in which failure of communication has occurred from the communication circuits of the prescribed number of the terminal devices during progress of the game in the common game space;

simulated signal generating means that generates a simulated operation signal that simulates the operation signal of each terminal device connected through said disconnected circuit; and simulated signal providing means that provides said simulated operation signal to the other terminal devices, respectively.

13. A method of game progress management employing a game progress management device to which a prescribed number of terminal devices that accept operations from players are connected so as to be capable of mutual communication of operation signals necessary for the progress of a game through communication circuits and which manages the progress of a network game conducted in a common game space and continues the network game in simulated fashion if a fault is generated in said communication circuits, wherein said game progress management device is made to execute:

abnormality monitoring processing of detecting a disconnected circuit in which inability to communicate has occurred from the communication circuits between said prescribed number of the terminal devices during the progress of the game in the common game space;

simulated signal generating processing of generating a simulated operation signal that simulates an operation signal of each terminal device connected through said disconnected circuit; and simulated signal provision processing of providing the simulated operation signal that was thus generated to the other terminal devices.

14. A game progress management program for a game progress management device to which a prescribed number of terminal devices that accept operations from players are connected so as to be capable of mutual communication of the operation signals necessary for a progress of a game through communication circuits and which manages the progress of a network game conducted in a common game space and continues the network game in simulated fashion if a fault is generated in said communication circuits, said game progress management program being for making said game progress management device function as:

abnormality monitoring means for detecting a disconnected circuit in which inability to communicate has occurred from the communication circuits between said prescribed number of terminal devices during the progress of the game in the common game space;

simulated signal generating means for generating a simulated operation signal that simulates an operation signal of each terminal device connected through said disconnected circuit; and simulated signal providing means for providing the simulated operation signal that was thus generated respectively to the other terminal devices.

\* \* \* \* \*